US012705938B1

(12) United States Patent
Herron et al.

(10) Patent No.: US 12,705,938 B1
(45) Date of Patent: Aug. 11, 2026

(54) VEHICLE SERVICE PROVIDER SCHEDULING SYSTEM AND METHOD OF USE

(71) Applicant: Opus IVS, Inc., Ann Arbor, MI (US)

(72) Inventors: Brian J. Herron, Dexter, MI (US); Frank M. Terlep, Richardson, TX (US)

(73) Assignee: Opus IVS, Inc., Dexter, MI (US)

( * ) Notice: Subject to any disclaimer, the term of this patent is extended or adjusted under 35 U.S.C. 154(b) by 343 days.

(21) Appl. No.: 17/976,365

(22) Filed: Oct. 28, 2022

(51) Int. Cl.
*G07C 5/08* (2006.01)
*G07C 5/00* (2006.01)

(52) U.S. Cl.
CPC ........... *G07C 5/0808* (2013.01); *G07C 5/006* (2013.01)

(58) Field of Classification Search
CPC .............................. G07C 5/0808; G07C 5/006
See application file for complete search history.

(56) References Cited

U.S. PATENT DOCUMENTS 7,636,676 B1 * 12/2009 Wolery ............. G06Q 30/0611 705/26.4
2005/0171781 A1 * 8/2005 Poploskie ........... H04M 3/4936 704/270.1
2009/0164252 A1 * 6/2009 Morris ................... G16H 10/60 705/3
2015/0286979 A1 * 10/2015 Ming ............. G06Q 10/063112 705/7.14
2016/0050213 A1 * 2/2016 Storr ......................... H04L 9/32 726/6
2016/0217430 A1 * 7/2016 Loring ............... G06Q 10/1095
2017/0277527 A1 * 9/2017 Margol ..................... G06F 8/61

* cited by examiner

*Primary Examiner* — Scott A Browne
*Assistant Examiner* — Shahira Baajour
(74) *Attorney, Agent, or Firm* — Gardner, Linn, Burkhart & Ondersma LLP

(57) ABSTRACT

A system and method of scheduling an outsourced vehicle service includes providing access to a service scheduling program at a repair facility via a vehicle diagnostic computer tool or via a vehicle repair estimating software system, where the service scheduling program is integrated into or accessible by the vehicle diagnostic computer tool or the vehicle repair estimating software system, and includes scheduling an outsourced service for a vehicle to be performed by an outsourced service provider at a service location, where the scheduling is done by a repair service provider of the repair facility using the service scheduling program. The scheduling includes providing one or more potential outsourced service providers for performing the outsourced service, providing one or more potential appointment times for the outsourced service providers, selecting an outsourced service provider from the one or more potential outsourced service providers, and selecting an appointment time for the outsourced service.

15 Claims, 14 Drawing Sheets

VEHICLE SERVICE PROVIDER SCHEDULING SYSTEM AND METHOD OF USE

BACKGROUND OF THE INVENTION

The present invention is directed to automotive service systems, and in particular to scheduling of a service by a service provider through or as part of a vehicle repair estimating software system and/or a vehicle diagnostic computer tool.

Automotive service systems are well known in the art and are effective means to provide repair, cleaning or maintenance work to a vehicle. For example, after an accident or when the vehicle is not working properly it requires repair. Part of a repair may require verifying that the repair of certain vehicle systems, such as vehicle safety systems, was successful. A facility performing the repairs may not have all of the qualifications, equipment or ability to verify the repairs it has performed. Accordingly, it may be necessary for a second service provider to verify that the vehicle was properly repaired, including through diagnostics and/or vehicle calibrations to ensure that the safety systems of the vehicle operate as designed. This could include sensors, mirrors, alarms, cameras or the like.

SUMMARY OF THE INVENTION

The present invention provides a vehicle service scheduling system and method for managing and scheduling vehicle services. The vehicle service scheduling system includes a scheduling program or program module that may be accessed and utilized at a repair facility via or as part of a vehicle repair software estimating system and/or a vehicle diagnostic computer tool for scheduling a particular service by another service provider, where at the scheduled service time the vehicle may either be brought to a remote service location of that other service provider or that other service provider may come to the repair facility.

A scheduling program module may be local to the diagnostic tool or the vehicle repair estimating software system at a repair facility. Alternatively, the scheduling module may be remotely accessed by the diagnostic tool or the vehicle repair estimating software system via a scheduler server, which includes the scheduling module. The scheduling program module enables service requests for vehicles to be initiated by communicating with the scheduler server via a network connection to schedule requested services from selected service providers who provide the requested service. Criteria may be established for effecting the selection of a service provider, including based on availability, qualifications of the service provider, status of the vehicle, and the like.

When a service provider is selected for the vehicle service, a particular day/time may be selected from a list of available timeslots. When a timeslot is selected, the service provider receives the service request. After completing any service qualifications/validations, the selected service provider assigns a technician and/or service location to perform the selected service as part of the diagnostic workflow of the vehicle repair, such as after completion of a post scan event confirming that the electronic system of the vehicle is not registering any fault codes or diagnostic trouble codes ("DTCs"). A notice that a technician or service location has been assigned by the service provider is sent to the requester. The selected service provider performs the steps to a pre-service checklist ensuring the vehicle and the procedure are prepared for the service. The selected service provider performs the service while monitoring and recording results and reports. The results and reports are used to generate a report for the requested service.

In an aspect of the present invention, a method of scheduling an outsourced vehicle service provided by a service provider comprises providing access to a service scheduling program at a repair facility via a vehicle diagnostic computer tool or via a vehicle repair estimating software system, where the vehicle diagnostic computer tool is configured to be operatively connected to a diagnostic port of a vehicle to be in communication with an electronic system of the vehicle and where the vehicle repair estimating software system comprises a computer integrated with a vehicle repair estimating software program, and where the service scheduling program is integrated into or accessible by the vehicle diagnostic computer tool or the vehicle repair estimating software system. The method comprises scheduling an outsourced service for a vehicle to be performed by an outsourced service provider at a service location, where the scheduling of the outsourced service is done by a repair service provider of the repair facility using the service scheduling program and in turn comprises: providing, with the service scheduling program, one or more potential outsourced service providers for performing the outsourced service; providing, with the service scheduling program, one or more potential appointment times for the one or more potential outsourced service providers for performing the outsourced service, wherein the appointment time comprises a date and a time; selecting, with the service scheduling program, an outsourced service provider from the one or more potential outsourced service providers; and selecting, with the service scheduling program, an appointment time for the outsourced service. The outsourced service may, for example, be a vehicle calibration or a vehicle safety system service for the vehicle.

In accordance with aspects of the present invention, the service scheduling program is configured to filter potential outsourced service providers based on one or more scheduling factors, where the providing, with the service scheduling program, one or more potential outsourced service providers for performing the outsourced service is based on the at least one scheduling factor.

In particular embodiments the scheduling factor comprises a qualification to perform the required outsourced service, where only outsourced service providers that are qualified to perform the required outsourced service are provided via the service scheduling program.

In further embodiments, the scheduling factor comprises an availability of the outsourced service provider, where scheduling includes receiving from the repair service provider a desired appointment time for the outsourced service and only outsourced service providers that are available at the desired appointment time are provided via the service scheduling program.

Still further, a scheduling factor may comprise a distance from the repair facility to the outsourced service provider, where scheduling includes receiving from the repair service provider a distance limit for the distance between the repair facility and the outsourced service provider and only outsourced service providers that are within the distance limit are provided via the service scheduling program.

The method may further include performing a diagnostic scan of the electronic system of the vehicle with the diagnostic computer tool, with the scheduling of the outsourced service being prevented if the diagnostic scan returns diagnostic trouble codes. Still further, the method may include providing at least one qualification question to be answered by the repair service provider, with the scheduling of the outsourced service being prevented or permitted based on responses to the qualification questions.

The service scheduling program may comprise a scheduling program module retained on the vehicle diagnostic computer tool or on the vehicle repair estimating software system, and may communicate with a scheduling server via a network connection during scheduling of the outsourced service.

In a particular embodiment the method includes generating an estimate of vehicle repairs using the vehicle repair estimating software system, with the scheduling of the outsourced service comprising scheduling the outsourced service during the step of generating an estimate of vehicle repairs using the vehicle repair estimating software system.

These and other objects, advantages, purposes, and features of this invention will become apparent upon review of the following specification in conjunction with the drawings.

DESCRIPTION OF THE PREFERRED EMBODIMENTS

Figure 1:
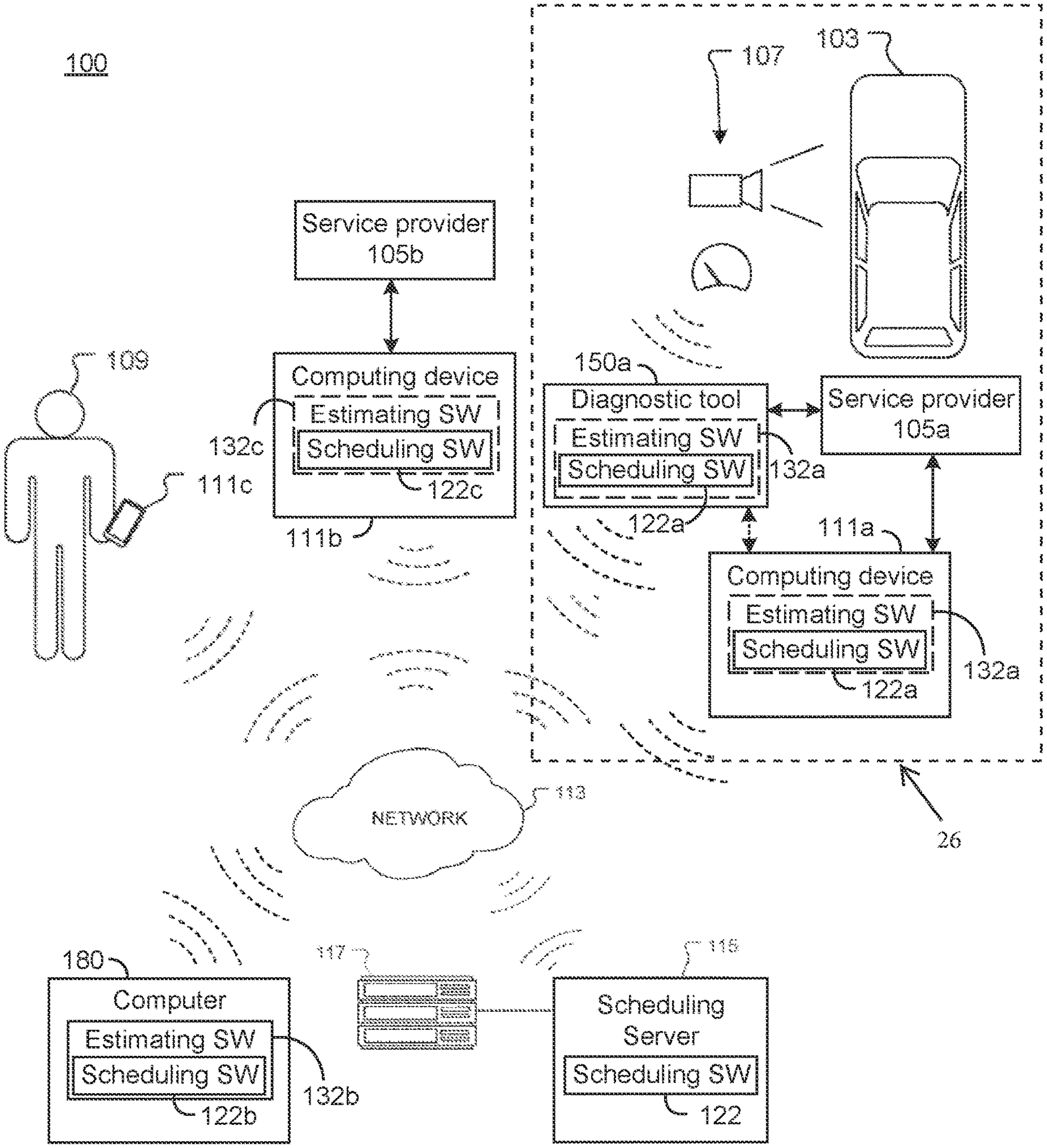
FIG. 1 is a diagram of a vehicle service and scheduling system in accordance with the present invention.

The present invention will now be described with reference to the accompanying figures, wherein the numbered elements in the following written description correspond to like-numbered elements in the figures.

Referring to the drawings, an exemplary vehicle service scheduling system 100 and methods for managing and scheduling vehicle services at a repair facility includes a scheduling program or program module operating with a vehicle diagnostic computer tool and/or within or as part of a vehicle repair estimating software system. A scheduling program module may be local to a vehicle diagnostic computer tool 150*a*, a computing device 111*a* having or interfaced with a vehicle repair estimating software, or to a remote computer 180 having or interfaced with a vehicle repair estimating software to thereby comprise a vehicle repair software estimating software system. Alternatively, the scheduling module may be remotely accessed by the portable computer 111*a* or the diagnostic tool 150*a* or the remote computer 180 of the estimating software system, such as via a scheduler server 115, which includes the scheduling module. The scheduling program module may be used by the repair facility to initiate service requests for vehicles by communicating with the scheduler server via a network connection to schedule requested services from selected service providers who provide the requested service, where the selected service providers provide services that are not provided by or at the repair facility, such as due to the need for specialized training, skills, equipment, licenses, or the like. Criteria may be established for effecting the selection of a service provider, including based on availability, qualifications of the service provider, status of the vehicle, and the like.

In a particular embodiment, selecting a service provider for the vehicle service includes selecting a particular day/time for the service from a list of available timeslots. When a timeslot is selected, the selected service provider receives the service request and assigns a technician and/or service location to perform the selected service. A notice that a technician or service location has been assigned by the service provider is sent to the requester. As described herein, when the selected service provider receives the vehicle, the scheduling module may be used to manage and monitor a pre-service checklist that includes items needed to confirm that the vehicle, the test, calibration, and/or procedure is set up and prepared for the service, and to document the condition of the vehicle and to document the preparation steps performed before beginning the service. The scheduling module is also used to monitor and document the steps of the service as it is performed and to ensure that the resulting reports and documentations are uploaded and stored for later use. Lastly a post-service review is performed with the scheduling module, the steps to the service procedure are reviewed, and all resulting documentation and supporting documentation is retrieved, uploaded, and stored. The uploaded documents are used to generate a report for the service.

Figure 1A:
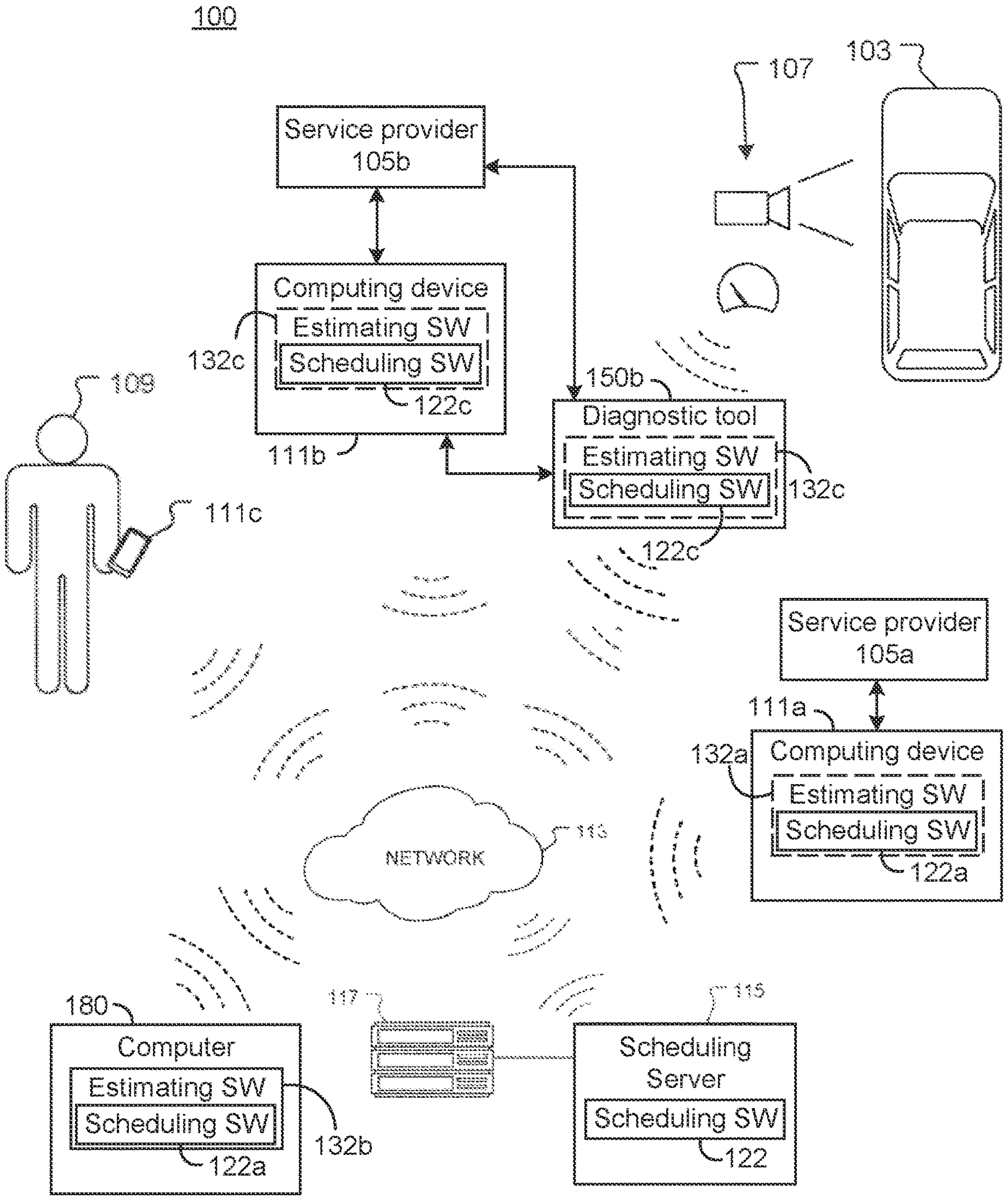
FIG. 1A is another diagram of the vehicle service and scheduling system of FIG. 1.

FIG. 1 illustrates a diagram of a vehicle service scheduling system 100 in accordance with an embodiment of the present application, such as at a repair facility 26. As discussed in more detail below, the scheduling system 100 may utilize a vehicle diagnostic computer tool 150*a* of a repair facility 26 service provider 105*a*, such as may be used to monitor and/or perform a maintenance service performed on a vehicle, including to scan the vehicle 103 for diagnostic trouble codes (DTCs). In particular, as discussed in more detail below, a scheduling module 122*a* of the vehicle diagnostic computer tool 150*a* (see FIGS. 1 and 3) may be used by the service provider 105*a* to schedule a service on the vehicle 103 from another service provider 105*b*. Alternatively, the scheduling module 122*a* may be accessed or integrated with vehicle repair estimating software 132*a* on the vehicle diagnostic computer tool 150*a* or on another computing device 111*a* associated with the repair facility 26. For example, service provider 105*a* may be a service or repair shop, such as a body shop repairing collision damage to the vehicle 103 but requiring the services of service provider 105*b* to perform a calibration and/or some other service on the vehicle (e.g., ADAS safety system calibration or service) for which service provider 105*a* does not have the necessary equipment or ability to perform. As described in detail below, a scheduling module 112*b* of the computing device 111*b* of the other service provider 105*b* may be used to receive the service request and manage the service on the vehicle 103 (see FIGS. 1 and 3). Similarly, the scheduling module 122*b* of the computing device 111*b* or the diagnostic tool 150*b* of the other service provider 105*b* may also be accessed from estimating software 132*c* on the computing device 111*b* or the diagnostic tool 150*b*. The computing device 111*a*, the diagnostic tool 150*a*, a diagnostic tool 150*b*, and the computing device 111*b* are interconnected via a network 113. The computing device 111*a*, the diagnostic tool 150*a*, the diagnostic tool 150*b* used by the other service provider 105*b* (see FIG. 1A), and the computing device 111*b* may also be coupled to a scheduling server 115 for managing the scheduling of service requests from different service requesters (each with a respective instance of the scheduling module 122*a*, 122*c*). The scheduling server 115 is also in communication with a database 117. The database 117 contains data of its own creation or that of a third party that provided data to the scheduling server 115. For example, the database 117 contains schedule information for service provider 105*b*. In other words, the database 117 stores and maintains the schedule information for any service provider offering service to be scheduled by the scheduling server 115, via the scheduling modules 122 (either local instances or remotely accessed). The outsourced service provider 105*b* may be an entity having a fixed facility and/or may be a mobile service entity that is able to travel to a repair facility 26, such as via a repair vehicle used to transport equipment necessary for performing the outsourced repair service.

Figure 3:
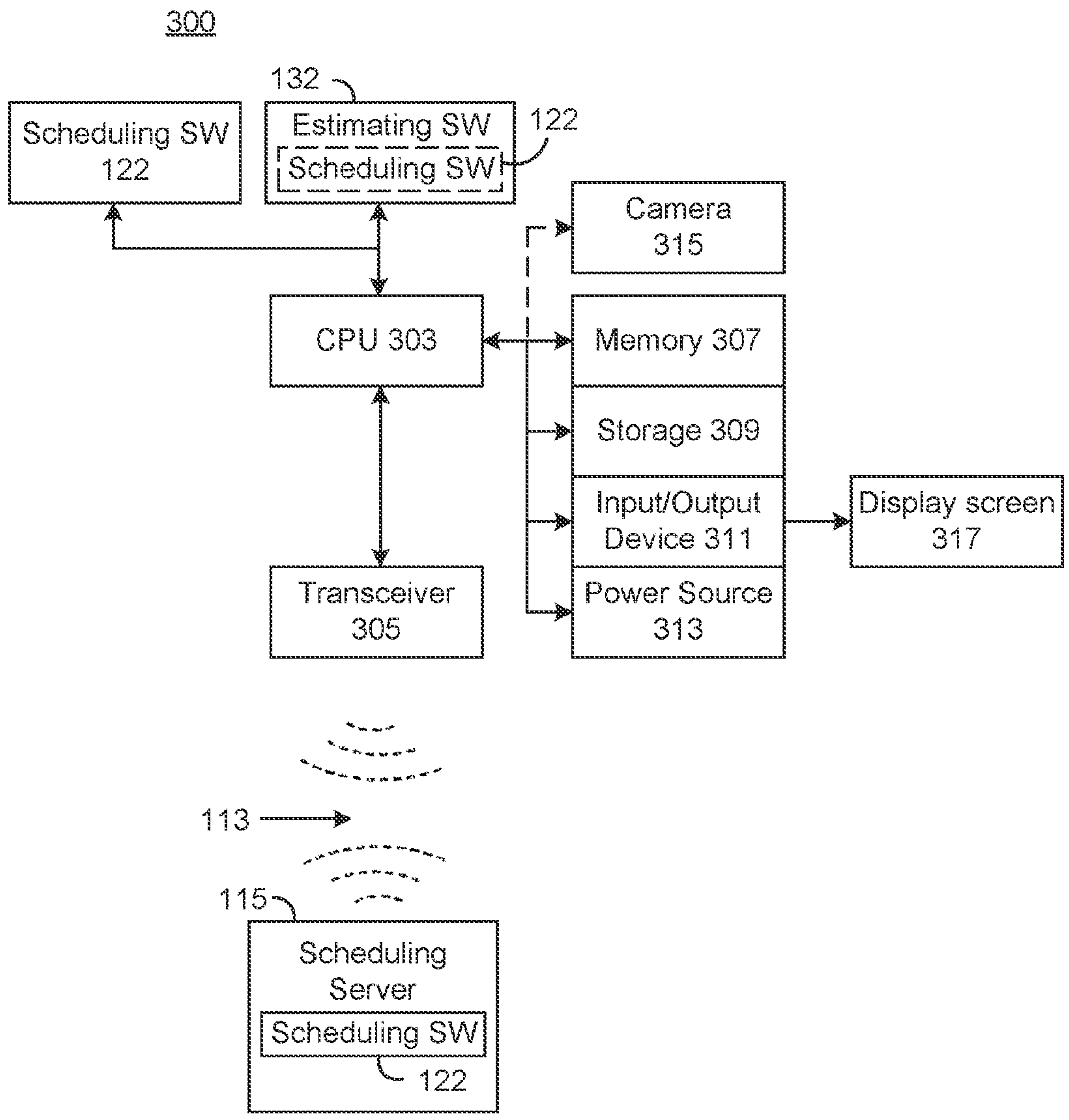
FIG. 3 is a diagram further detailing the diagnostic tool of FIG. 1 in accordance with the present invention.

In one embodiment, an exemplary vehicle repair estimating system or program, such as shown in FIG. 1, includes a remote computer 180 with vehicle estimating software 132*a*. The estimating software 132*a* may be used to document the required services and their associated costs, as well as to compile or collect a post-completion report used as confirmation of completion of the repairs, including for documenting such as for insurance purposes. As discussed herein, the vehicle repair estimating software 132*a*, 132*b*, 132*b* of the remote computing device 111*a*, computing device 111*b*, and/or computer 180, respectively, include instances of or are integrated with the scheduling software 122*a*, 122*c*, and 122*b* for scheduling service from within the estimating software 132 or as part of documenting the required vehicle repairs. As also illustrated in FIG. 3, the computing devices 111 may include estimating software 132. The vehicle repair estimating software may be, for example, provided by Audatex North America, Inc. or by Enlyte Group, LLC, such as under its MITCHELL brand of estimating software, or may be provided CCC Intelligent Solutions, such as under its CCC brand of estimating software. The vehicle repair estimating software is configured to receive information regarding damage to a vehicle and in turn document the repairs needed for the vehicle, including providing a cost estimate based on the type of damage to the vehicle, the repair parts thus needed and associated costs thereof, and the estimated time for repair including labor costs for such repairs, such as to create a detailed invoice for a vehicle owner, insurance adjuster, or the like. As part of this, the vehicle repair estimating software is operable to list or detail all the repair steps necessary, including as specified by the vehicle manufacturer, including operations such as calibration processes for which a given repair facility 26 service provider 105*a* is not able to perform, and thus requires assistance from another service provider 105*b*.

A vehicle diagnostic computer tool 150, such as either of 150*a* or 150*b*, of the present invention may be configured substantially in accordance with the vehicle computer system of U.S. Pat. No. 11,257,307 and/or the vehicle diagnostic device of U.S. Pat. No. 11,423,715, both of which are hereby incorporated herein by reference in their entireties, but with the addition of or interfacing with scheduling modules 122, as well as potentially with the addition of or interfacing with vehicle estimating software 132. However, although diagnostic computer tools 150*a*, 150*b* are shown in the illustrated embodiment as including estimating software 132 it should be appreciated that a diagnostic computer tool 150*a*, 150*b* need not include such software. Accordingly, it should be appreciated that diagnostic tools 150*a*, 150*b* are connectable to an electronic system of a vehicle, such as via an OBD II port of the vehicle, to be in communication with ECUs of the vehicle and obtain data therefrom.

Figure 2:
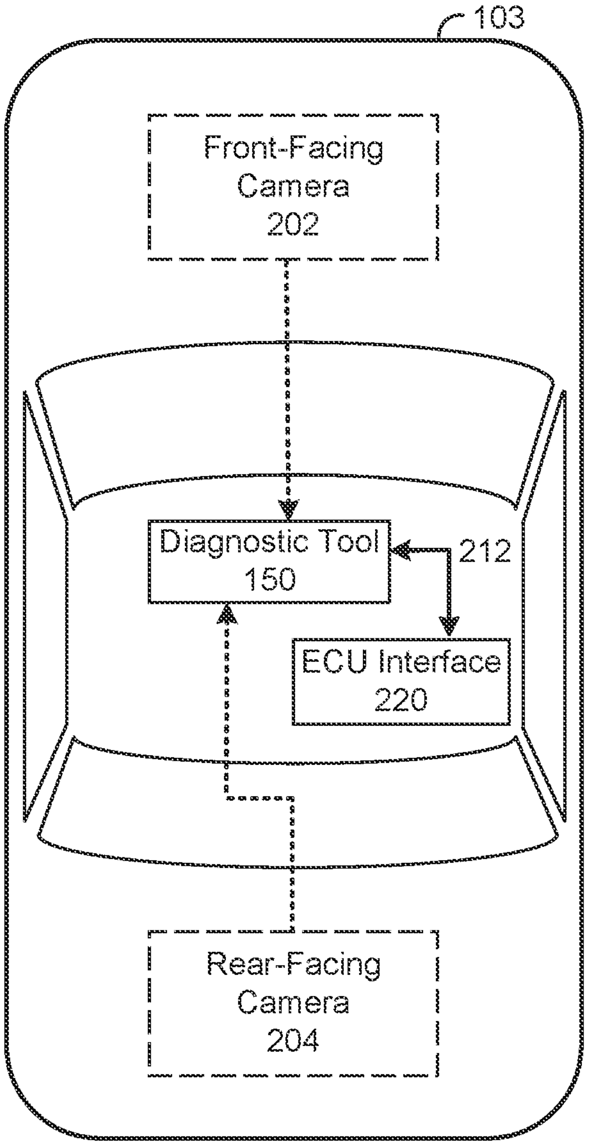
FIG. 2 is a diagram of a diagnostic tool of a vehicle service system coupled to a vehicle receiving service in accordance with the present invention.

As illustrated in FIG. 2, a diagnostic tool 150 is electronically coupled to the electronic control units (ECUs) of the vehicle 103. For example, in one embodiment, the diagnostic tool 150 is coupled to the vehicle ECUs via an ECU Interface 220, such as, an on-board diagnostic (OBD) diagnostic port of the vehicle 103 in order to receive data 107 from the various ECUs, such as an engine ECU, a body ECU, brake ECUs, and other ECUs, such as Adaptive Driver Assistance Systems ("ADAS") ECUs, and including other electronic parts and components of the vehicle 103. The diagnostic tool 150 is shown connected to the ECU interface 220 via a vehicle cable 212.

A user or observer can use the diagnostic tool 150*a*, while coupled to the vehicle 103 to monitor a service as it is performed at the service provider 105*a*. The diagnostic tool 150*a* includes an operator interface in the form of a display screen or touchscreen 317 to provide instructions and receive inputs from the user or observer (see FIG. 3). The diagnostic tool 150*a* (or the computing devices 111*a*, 111*c*) can provide instructions, such as procedural steps on a service the service provider 105*a* is currently carrying out. The diagnostic tool 150*a* can also be used by the service provider 105*a* to schedule a service provided by another service provider 105*b*, while the diagnostic tool 150*b* may be used by the other service provider 105*b* to manage the requested service. The instructions (for initiating a service request or for performing that service) may be provided from database 117, or another remote computer, or may be retained in the memory of the diagnostic tool 150*a*. As discussed herein, the instructions steps are provided on the display screen 317 of the diagnostic tool 150*a*. For example, if service provider 105*a* is unable to perform a particular operation, service provider 105*a* may use scheduling software module 122*a* of diagnostic computer tool 150*a* to schedule service by another service provider 105*b*.

As illustrated in FIG. 1, a computing device 111*a* may be communicatively coupled to the diagnostic tool 150*a*. Such coupling between the computing device 111*a* and the diagnostic tool 150*a* includes a cable (e.g., USB) or wireless connection (e.g., a Bluetooth, Wi-Fi network, or near-field communication (NFC) connection, or some other communications technology connection). A user or observer can use the computing device 111*a* to interact with the diagnostic tool 150*a*. For example, the user or observer may monitor the procedural steps of a service performed by the service provider 105*a*, review test data and procedural step results, control the progress of the service performed on the vehicle, and schedule services with other service providers (e.g., service provider 105*b*) via the interactive display screen 317 of the computing device 111*a*. Optionally, the diagnostic tool 150*a* may contain no user interface and requires the use of the computing device 111*a* to control the operation of the diagnostic tool 150*a*. Alternatively, the diagnostic tool 150*a* may be configured to provide user input and monitoring of services performed by the service provider 105*a*. That is, with the user input and service procedure monitoring provided by the diagnostic tool 150*a*, the computing device 111*a* may be used as a secondary monitoring station or may be omitted entirely.

Installing the diagnostic tool 150 into the vehicle 103 includes electronically coupling the diagnostic tool 150 to the vehicle's ECU interface 220 (via vehicle cable 212) to communicate with the vehicle's ECUs and receive data 107 from the ECUs during any service or repair performed on the vehicle. Diagnostic tool 150 enables the vehicle 103 to be scanned for DTCs at desired points in the repair or service.

Figure 4:
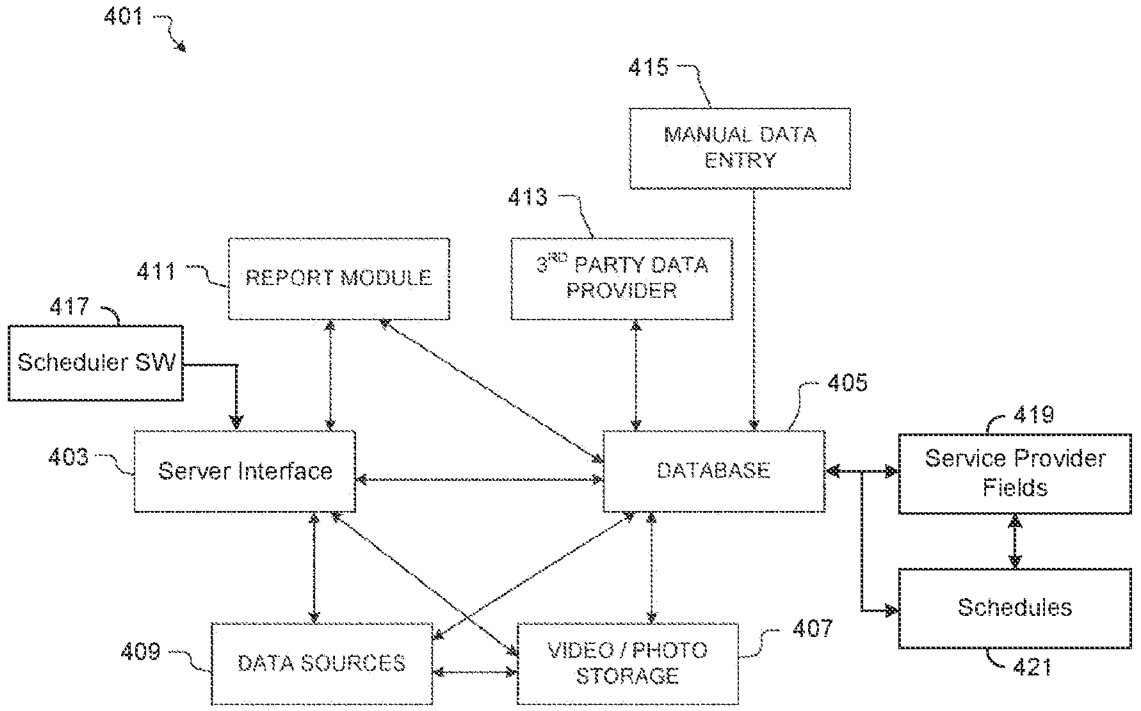
FIG. 4 is an exemplary schematic of the interactions of the vehicle service and scheduling system of FIG. 1.

Referring now to FIG. 4, the interactions of the vehicle service scheduling system 100 are illustrated. It is contemplated that in an embodiment 401 in use that a server interface 403 is the means whereby the service providers 105*a*, 105*b* and an individual 109 interact with the scheduling server 115. It is contemplated that the server interface 403 provides access to the database 405, a report module 411, data sources 409, and a video/photo storage 407. It is contemplated that each instance of the scheduler software 417 is in communication with the scheduling server 115 via the server interface 403. It is contemplated that service provider fields 419 and schedules 421 are also communicated with and stored in the database 405. The service provider fields 419 can include information related to the types of services a particular service provider provides while the schedule 421 provides available timeslots for particular service locations for each service provider.

It is contemplated that the database 405 is in communication with a third-party data provider 413 wherein information relevant to the work or status of the car 103 is exchanged. It is contemplated that manual data entry 415 could be used to populate data in the database 405.

The data sources 409 are contemplated to be, for example, the videos or photos of the vehicle 103 and taken before, during, and after any service. The video/photo imagery data is sent to the video/photo storage 407. It is contemplated that these data sources 209 could also be automated, mechanical, human operators, or the like. That is, the data sources 409 could also include other sources of imagery data captured before, during, and after any service performed on the vehicle 103.

When an individual 109 has delivered a vehicle 103 to a service provider 105*a* for a particular service and/or repair, it is contemplated that one or more additional services will need to be performed by another service provider 105*b*. Such additional services can include vehicle calibrations and other services (e.g., ADAS safety system calibrations and/or services). Other examples of services provided by another service provider (e.g., service provider 105*b*) may include, for example, fuel tank filling, car washing, vehicle painting, body work, pre and post calibration diagnostic scans, test drives, vehicle delivery, on-site calibration procedures, module programming or reprogramming, air conditioning chemical recovery and recharge, ADAS camera calibrations, vehicle radar calibrations, and other services.

As illustrated in FIG. 1, when the service provider 105*a* is ready to schedule a service with another service provider 105*b*, the service provider 105*b* utilizes an instance of the scheduling software 122*a*. For example, the individual 109 may schedule the service with the other service provider 105*b* via an instance of the scheduling software 122*a* on a computing device 111*c* or the service provider 105*a* may schedule the service via an instance of the scheduling software 122*a* on any of the computing devices 111*a* or the diagnostic tool 150*a*. As discussed herein, the instance of the scheduling software 122*a* may also be accessed from within estimating software 132*a* on the computing device 111*c*, or on either of the computing device 111*a* or the diagnostic tool 150*a*. As described herein, a procedure for requesting and scheduling the service with the other service provider 105*b* may be accomplished by entering vehicle data, selecting a service provider, and selecting a timeslot (on a selected day) at a selected service location by interacting with an interactive display screen 317 of the diagnostic tool 150*a*, or the computing devices 111*a*, 111*c*. As discussed in more detail below, the action of setting or scheduling a service appointment to take place with the service provider 105*b* may be done at various points, including while a service provider 105*a* is providing an estimate using the estimating software 132, or upon acceptance of a repair quote from service provider 105*a* by a vehicle owner, or by use of a diagnostic computer tool 150 during service by service provider 105*a*, or by use of a diagnostic computer tool 150 upon completion of repairs by service provider 105*a*, such as upon successful completion of a post-repair diagnostic scan using diagnostic computer tool 150.

Figure 5A:
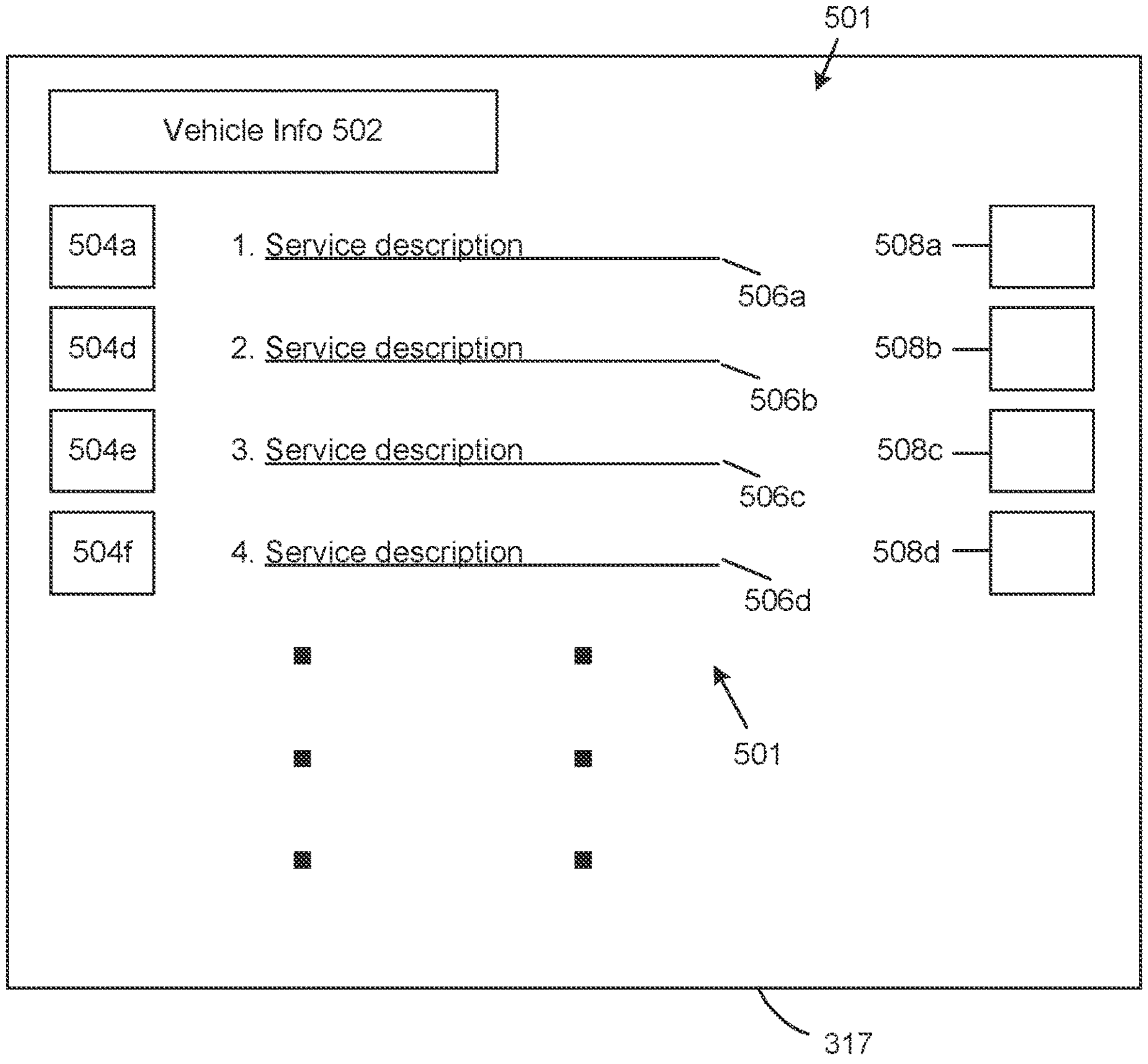
FIG. 5A is a diagram of an exemplary vehicle service selection panel displayed on a display screen in accordance with the present invention.

Referring to FIG. 5A, the scheduling of a service begins with a request for a service via a service request panel 501 of the scheduling module 122*a* that is displayed on the display screen 317. When a service request is initiated, vehicle information 502 is provided to the scheduling software 122*a*. For example, vehicle make, model, year, VIN, and vehicle insurer are provided, which may be manually entered or automatically obtained, such as by imaging a VIN and optical character recognition, or by reading or obtaining information such as the VIN from the electronic system of the vehicle using a diagnostic computer tool 150. To aid in determining what additional services need to be performed by another service provider, associated repair order lines may also be provided to the scheduling software 122*a* to identify what services have already been performed on the vehicle 103 and to identify what additional services are likely to be needed. Such information may be used by the scheduling module 122*a* to present possible services that may need to be performed. Such information may also be used by the estimating software 132 to rule out those services that will not need to be performed by another service provider (e.g., if the vehicle 103 does not include any ADAS safety systems, then ADAS calibration and maintenance services are not indicated). The repair order lines may also be used by the requester to determine what services they wish to request.

As illustrated in FIG. 5A, with the vehicle information 502 provided, one or more possible services and their descriptions may be displayed by the scheduling module 122*a* when interfacing with the estimating software 132, such as upon a selection panel 501. As discussed herein, the list of possible services and their descriptions may be retrieved from a local memory (within the diagnostic tool

150*a* or computing device 111*a*, 111*c*), or the scheduling module 122*a* may retrieve the list of services from the database 117 via the scheduling server 115. As illustrated in FIG. 5A, the selection panel 501 and its list of services 506*a*-506*d* is displayed on the display screen 317 of the diagnostic tool 150*a*, one of the computing devices 111*a*, 111*c*, or the remote computer 180. Alongside each service 506*a*-506*d*, a corresponding estimated cost 508*a*-508*d* may be displayed, with a corresponding selection button or display field 504*a*-504*d* arranged on the opposite side for selecting that respective service 506*a*-506*d*. Such possible services to be performed by the other service provider 105*b* include, for example, pre-calibration scans, ADAS safety system component (e.g., radar sensors, cameras, and ADAS functions) scans and calibrations, post-calibration scans, a test drive, vehicle delivery, diagnostic scans, and module programming/reprogramming). When selecting an available service for the request, a user (e.g., individual 109 or a technician at the service provider 105*a*) will manually toggle the associated field 506*a*, 506*b*, 506*c*, or 506*d* to indicate that the requester wishes for the service provider 105*b* to perform the requested service. In one embodiment, the list of available services is for a particular service provider (e.g., service provider 105*b*). Alternatively, the list of available services may include a list of available services from a plurality of service providers. That is, more than one service provider may provide the requested service and the requester may select the desired service provider along with the requested service.

Whether the scheduling software 122 is resident or accessible on either a vehicle diagnostic computer tool 150 or on an alternative computing device 111, and including whether it is integrated or accessible by vehicle repair estimating software 132, the scheduling software 122 may take various factors into account for purposes of scheduling. For example, the scheduling software 122 may take into account the technical capabilities of the service provider 105*b*. For example, if a particular service needed for a given vehicle requires particular equipment or capabilities that not all third party service providers 105*b* may have, scheduling software 122 may only list service providers 105*b* that are qualified for the particular service. For example, a database or matrix of qualifications for multiple service providers 105*b* may be maintained and updated with scheduling software 122 accessing or using the database to only list service providers 105*b* qualified for a given service. The qualifications for a given service may be based on for example, the types of vehicle brands and types of repairs for which the service provider 105*b* is qualified. In addition to calendar availability of the serviced provider 105*b*, the scheduling software 122 may additionally take into consideration distance or display distance of the service provider 105*b* from the repair facility 26.

The scheduling software 122 may further take into consideration diagnostic data obtained from the vehicle by the diagnostic computer 150. For example, the scheduling software 122 may not permit or enable the scheduling of a repair service by service provider 105*b* if a diagnostic scan reveals there to be DTCs present in the electronic system of the vehicle. For example, if during a post scan, after repairs by service provider 105*a* were attempted, the diagnostic data obtained from vehicle diagnostic computer tool 150 reveals there to be DTCs in the electronic system, the system 100 may prevent the scheduling of service by service provider 105*b*, such as preventing calibration services by service provider 105*b*. In the case of scheduling software 122 being resident or accessible by diagnostic computer tool 150, the diagnostic information is understood to be present at the diagnostic computer tool 150. Alternatively, a diagnostic computer tool 150 may transmit such scan data to a remote computer 111 having scheduling software 122, whereby the software 122 may not permit or enable the scheduling of a repair service by service provider 105*b* via the remote computer 111.

Still further, scheduling software 122 may present prequalification questions to a user of system 100 prior to permitting the scheduling of service by a service provider 105*b*, such as querying whether the vehicle is fully reassembled, such as if the vehicle's bumper is installed, or if exterior side view mirrors are installed, or if a rear camera or rear trunk or tailgate are installed. It should be appreciated that the prequalification questions may be based on a list of repairs generated by the estimating software 132. For example, a given vehicle repair order generated by the estimating software 132 may specify particular vehicle repairs to be performed. Integration of scheduling software 122 with estimating software 132 enables pre-repair qualification questions to be presented by software 122, such as on a display screen of vehicle diagnostic computer tool 150 or remote computer 111, that are specific to the repair on the given vehicle and the repairs performed thereon.

Figure 5B:
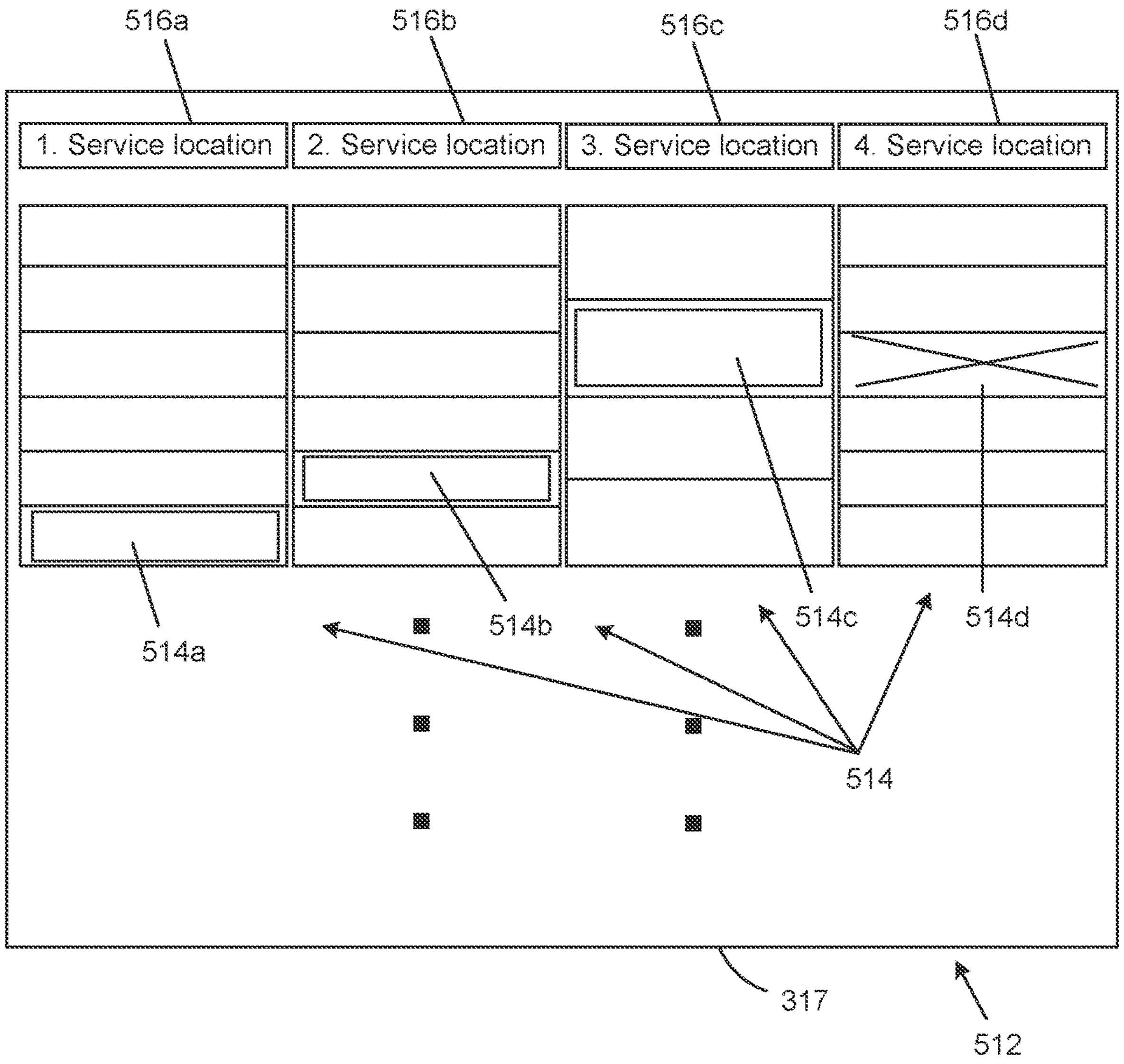
FIG. 5B is a diagram of an exemplary schedule selection panel displayed on a display screen in accordance with the present invention.

Referring to FIG. 5B, once the requested services 506 (and associated service provider 105*b*) have been selected via the selection panel 501, the scheduler module 122*a* uses the selected services to prepare a schedule panel 512, which is displayed on the display screen 317. The fields of the schedule panel 512 are retrieved by the scheduling module 122*a* from the scheduling server 115 (which accesses the schedule information from the database 117). The scheduling server 115 provides availability data for the schedule panel 512 related to the service locations 516*a*, 516*b*, 516*c*, 516*d* of the provider 105*b* that provide the requested service (s) and have available timeslots. With the schedule data received from the scheduling server 115, the scheduling module 122*a* displays the schedule panel 512. As illustrated in FIG. 5B, the schedule panel 512 is populated with available timeslots 514 for the service locations 516*a*, 516*b*, 516*c*, and 516*d* that provide the requested service(s) and have available timeslots 514. Thus, a timeslot 514*a* for service location 516*a* may be selected by manually toggling the associated timeslot field 514*a*. Note that the timeslots 514 may have a variety of time durations. For example, service location 516*c* includes timeslots 514 (e.g., timeslot 514*c*) with longer durations as compared to the timeslots 514 (e.g., timeslot 514*b*) for any of the other service locations 516*a*, 516*b*, and 516*d*. As illustrated in FIG. 5B, the timeslots 514 (e.g., timeslot 514*d*) that are unavailable will be greyed out or crossed out. Alternatively, those timeslots 514 that are not available for selection by the user or requester will be absent from the field of timeslots 514.

Figure 5C:
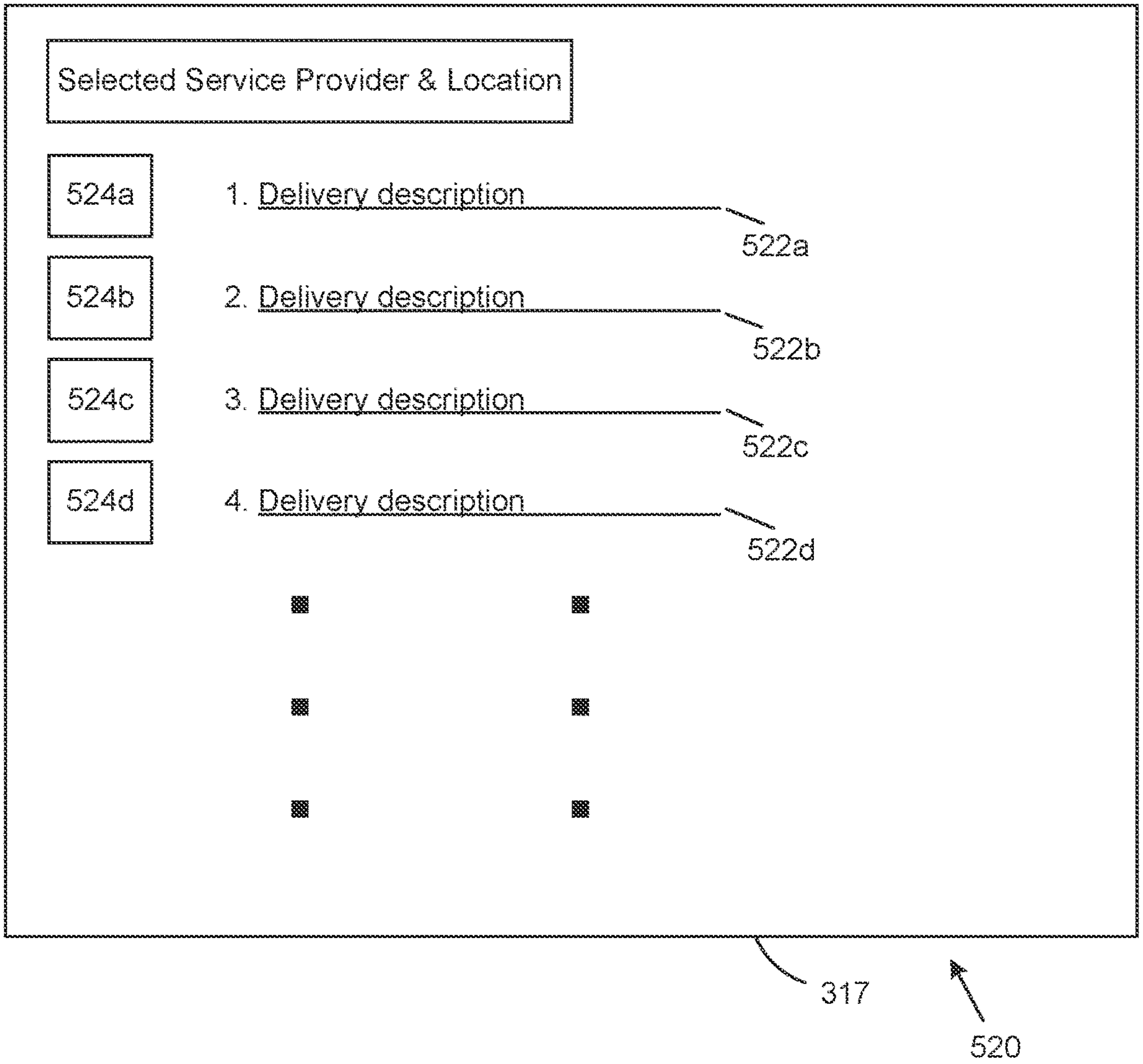
FIG. 5C is a diagram of an exemplary transportation/delivery selection panel displayed on a display screen in accordance with the present invention.

Referring to FIG. 5C, with a service location 516 selected, the scheduling module 122*a* will assist the requester or user with options for selecting how the vehicle is to be made available for the selected service(s). For example, the scheduling module 122*a* displays a transportation panel 520 populated with transportation options 522*a*, 522*b*, 522*c*, and 522*d* along with corresponding selection buttons 524*a*, 524*b*, 524*c*, and 524*d*. For example, the possible transportation options 522*a*, 522*b*, 522*c*, and 522*d* can include the service provider 105*b* (or its service location 516) picking up the vehicle 103, towing the vehicle to the service location 516 (with the option for the towing to be either one way or round trip), or the service provider 105*a* will drive the vehicle 103 to the other service provider 105*b*. Other transportation means may also be selected (via a corresponding selection button 524) for delivering the vehicle 103 to the service location 516. Alternatively, the transportation options will be moot if the service location is an on-site service technician that comes to the location of the vehicle 103 (at the service provider 105*a*). Or the transportation option for an on-site service may be used to designate the location of the vehicle 103 to allow the selected service provider 105*b* (and its selected service location 516) to assign a technician for the on-site service.

With the requester having selected the requested services, the desired service provider (e.g., service provider 105*b*), the desired service location and timeslot, and arranged for delivery or pickup of the vehicle 103 for service, the service request is transmitted by the scheduling module 122*a* to the selected service provider 105*b*. For example, the scheduling module 122*a* of the diagnostic tool 150*a*, one of the computing devices 111*a*, 111*c*, or the scheduling module 122*b* of the remote computer 180 sends the request (via the network 113) directly to the scheduling module 122*c* of the computing device 111*b* of the service provider 105*b*. The diagnostic tool 150*b* of the service provider 105*b* may also be used to receive the service request (see FIG. 1A). As discussed herein, the scheduling module 122*c* may be accessed from scheduling software 132*c* of the computing device 111*b* and/or the diagnostic tool 150*b*.

With the service request received by the other service provider 105*b*, the requested service(s) are reviewed. The service provider 105*b* may also determine that an additional service is necessary. When additional services are needed, the service provider 105*b* will notify the requesting party (e.g., the service provider 105*a*) and give them the option to approve the additional services and add them to the requested services. With the service request reviewed, the transportation options can be arranged, and the vehicle 103 delivered to the service location 516 of the other service provider 105*b*. Obviously, if the service is performed by an on-site technician of the other service provider 105*b*, then the vehicle 103 will remain in its original location (e.g., service provider 105*a* or some other location), or will be moved to a designated location. With the service request received by the other service provider 105*b*, the other service provider 105*b* will also assign the requested service to a technician. Once the technician has been assigned, the requester will be notified. This confirms the receipt of the service request and that a technician has been assigned for the request date/time and service location. As described herein, the confirmation and notification of technician assignment may be communicated to the requester via network 113 using the scheduling module 122*c*. The requester (e.g., the original service provider 105*a*) will receive the confirmation and notice of technician assignment via the corresponding scheduling module 122*a* on the diagnostic tool 150*a*, the computing device 111*a*, or the remote computer 180.

Figure 5D:
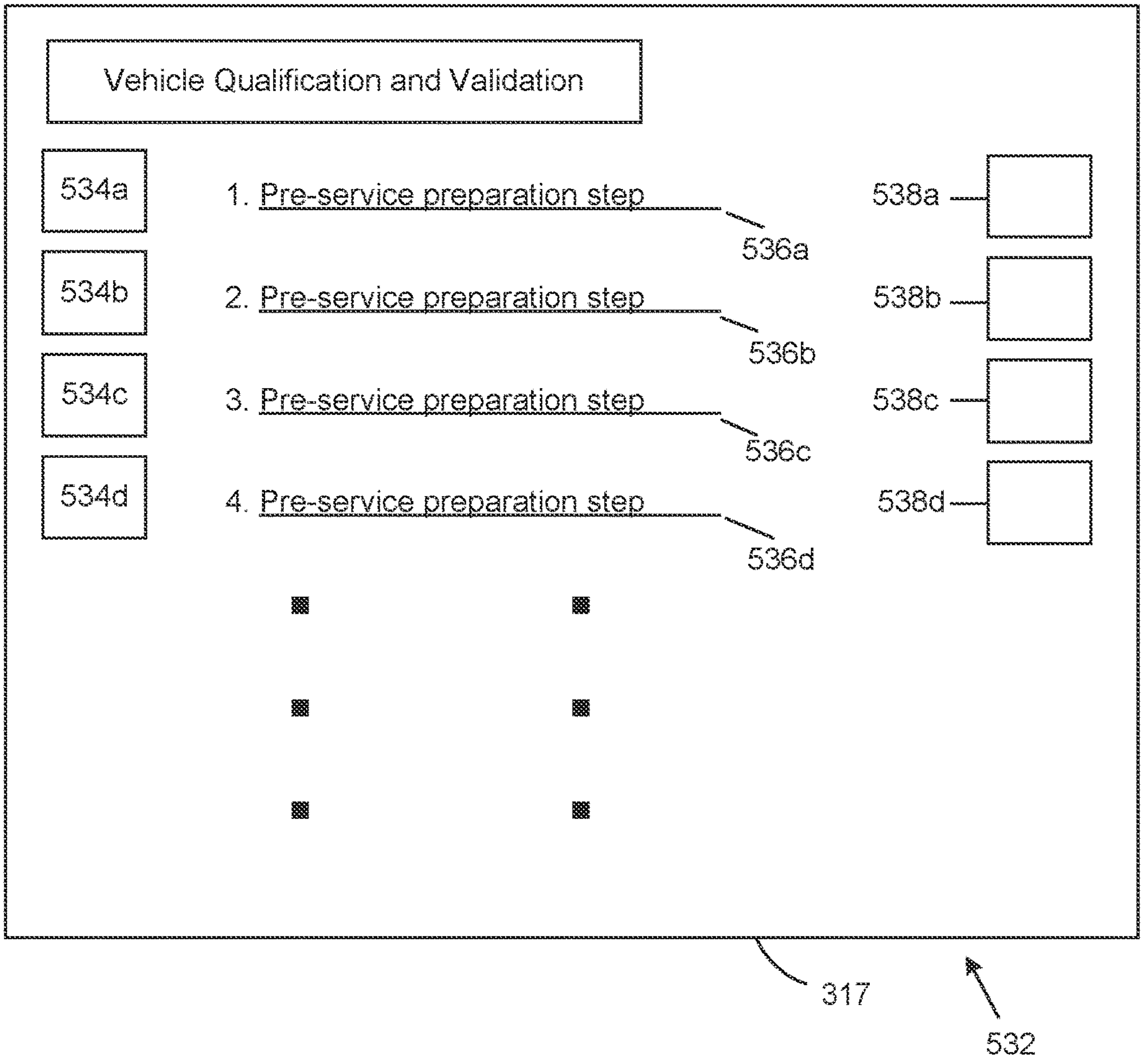
FIG. 5D is a diagram of an exemplary vehicle validation checkbox panel displayed on a display screen in accordance with the present invention.

Referring to FIG. 5D, with the vehicle 103 ready for the requested service, the requesting service provider 105*a* will also provide a vehicle validation to ensure that the vehicle is ready for the requested service. A vehicle validation panel 532 is displayed on the display screen 317 of the diagnostic tool 150*a*, the computing device 111*a*, or the remote computer 180. The vehicle validation panel 532 provides a list of vehicle validation steps for the service provider 105*a* to work through. For example, before the vehicle 103 is considered validated and ready for the requested service(s), a series of service preparation steps 536*a*-536*d* are displayed in the vehicle validation panel 532 on the display screen 317. With each of the service preparation steps 536*a*-536*d*, corresponding completion buttons 534*a*-534*d* and document upload indicators 538*a*-538*d* are arranged on either side of the service preparation steps 536*a*-536*d*. The service preparation steps 536*a*-536*d* may include a variety of vehicle safety and procedural steps. For example, the steps may include a verification that a post-repair scan was completed, that the fuel tank has been filled (or is full), that tire pressure levels have been checked and validated, and that any vehicle alignments performed by the service provider 105*a* have been verified. When one of the service preparation steps (e.g., 536*a*) has been completed, a corresponding completion button 534*a* will be actuated. Such actuations may be implemented by manually selecting the clickable button, or the actuation may be an automatic output from the diagnostic tool 150*a* during the performance of the repair or afterwards. For example, once a post-repair scan of the vehicle 103 is performed by the diagnostic tool 105*a*, if the results are acceptable, the corresponding completion button 534 for a post-repair scan will be actuated, showing that that particular vehicle validation step 536 has been carried out. If the service preparation step 536 is performed manually, the actuation of the corresponding completion button 534 will also be actuated manually. The vehicle validation may be performed at other times before providing the vehicle to the other service provider 105*b*.

With the vehicle validation complete, the resulting vehicle documentation is communicated to the scheduling server 115 via the scheduling module 122*a*. With the document uploaded, the corresponding document upload indicator 538 will be actuated. As discussed herein, once the vehicle documentation has been received by the scheduling server 115, it will be used as part of the post-service documentation discussed in detail herein.

Figure 5E:
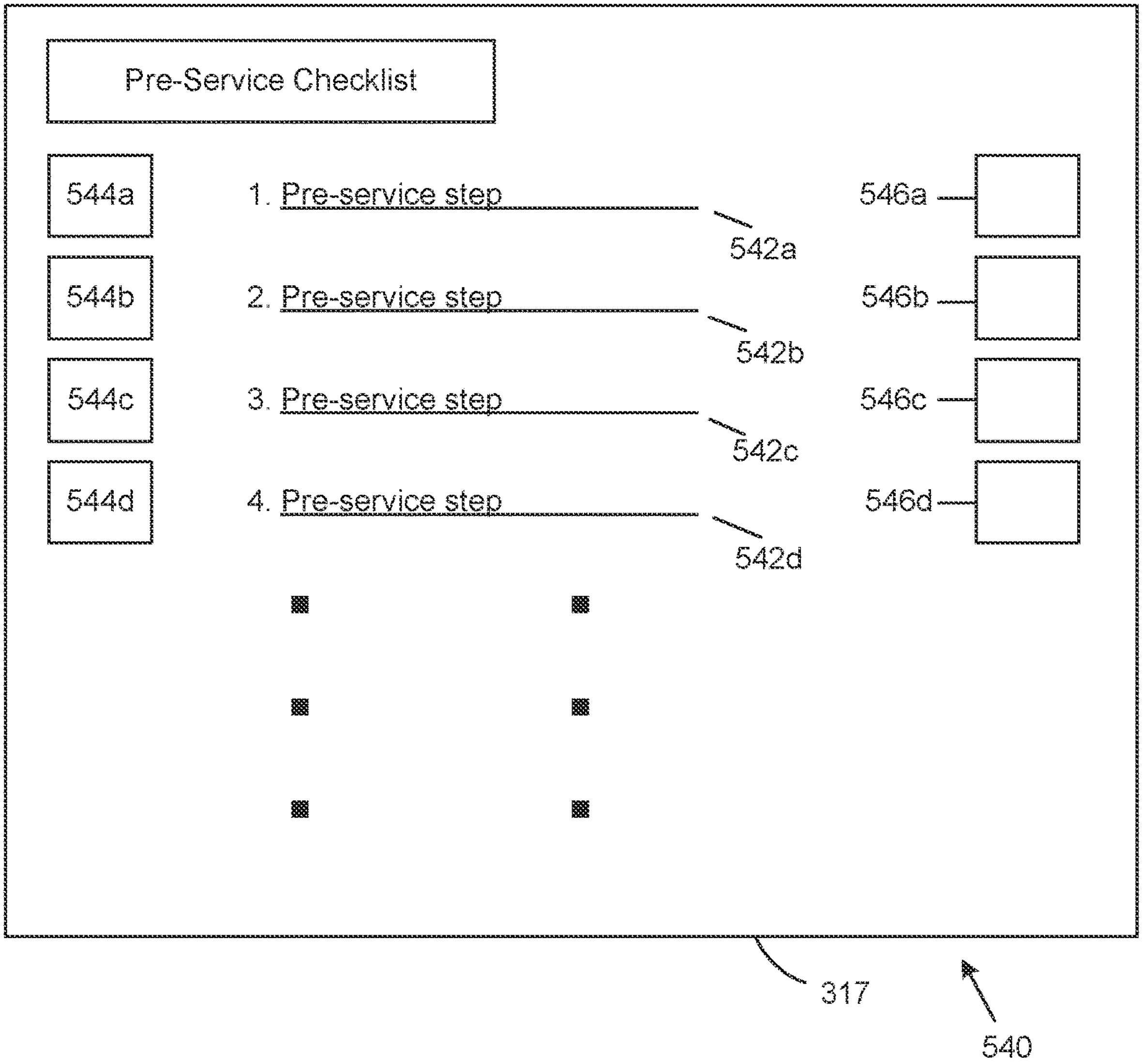
FIG. 5E is a diagram of an exemplary pre-service checklist panel displayed on a display screen in accordance with the present invention.

Referring to FIG. 5E, once the other service provider 105*b* has received the vehicle 103 (see FIG. 1A), the diagnostic tool 150*b* is connected to the electronic system of the vehicle 103 via the ECU interface 220 in the same manner as discussed herein. As guided by the scheduling module 122*c*, a pre-service check can now be completed on the vehicle 103 before the requested service is performed. FIG. 5E illustrates an exemplary pre-service checklist panel 540 displayed on a display screen 317 of the diagnostic tool 150*b* and/or the computing device 111*b*. The pre-service checklist panel 540 includes a list of pre-service steps 542*a*-542*d*. Corresponding sets of completion buttons 544*a*-544*d* and document upload indicators 546*a*-546*d* are arranged on either side of the list of pre-service steps 542*a*-542*d*. The pre-service checklist items are performed and documented to ensure that the other service provider 105*b* has documentation for liability and invoicing purposes to confirm what was performed. The pre-service steps 542*a*-542*d* may include, for example, taking photos (e.g., of setups, printed pre-service checklists, image of the vehicle's VIN, interior images of the vehicle, exterior images of the vehicle, test equipment setup images, calibration or service equipment setup images, images of printed documents related to the setup, and other images to document the setup and state of the vehicle 103), performing tire pressure level validations, performing vehicle alignment checks, verifying/emptying the vehicle contents, and identifying and setting up static targets or other equipment needed for the service (images would also be taken of any equipment setup for the service).

As illustrated in FIG. 5E, once each pre-service checklist item 542*a*, 542*b*, 542*c*, 542*d* has been completed, the corresponding completion button 544*a*, 544*b*, 544*c*, 544*d* will be actuated. As discussed herein, such actuation may be implemented by manually selecting the clickable button or the actuation may be an automatic output from the diagnostic tool 150*b* during the performance of the pre-service scan or other set-up procedure controlled by the diagnostic tool 150*b*. For example, once a pre-service scan or an alignment check has been performed on the vehicle 103 by the diagnostic tool 105*b*, if the results are acceptable, the corresponding completion button 544 for the pre-service step will be automatically actuated, showing that that particular pre-service checklist item or step 542 has (or had) been carried out. If the pre-service checklist item/step 542 is performed manually, the actuation of the corresponding completion button 544 will also be actuated manually.

As the pre-service checklist items 542*a*-542*d* are completed, the resulting documentation can be uploaded to the scheduling server 115 via the scheduling module 122*c*. Similar to the completion buttons 544, as each document is uploaded, the corresponding document upload button 546 is actuated. The confirmation buttons 546*a*-546*d* are actuated similar to the way that the completion buttons 544*a*-544*d* are actuated. As discussed herein, once the pre-service checklist documents (and those generated during the performance of the pre-service steps) have been received by the scheduling server 115, they will be used as part of the post-service documentation discussed in detail herein.

Figure 5F:
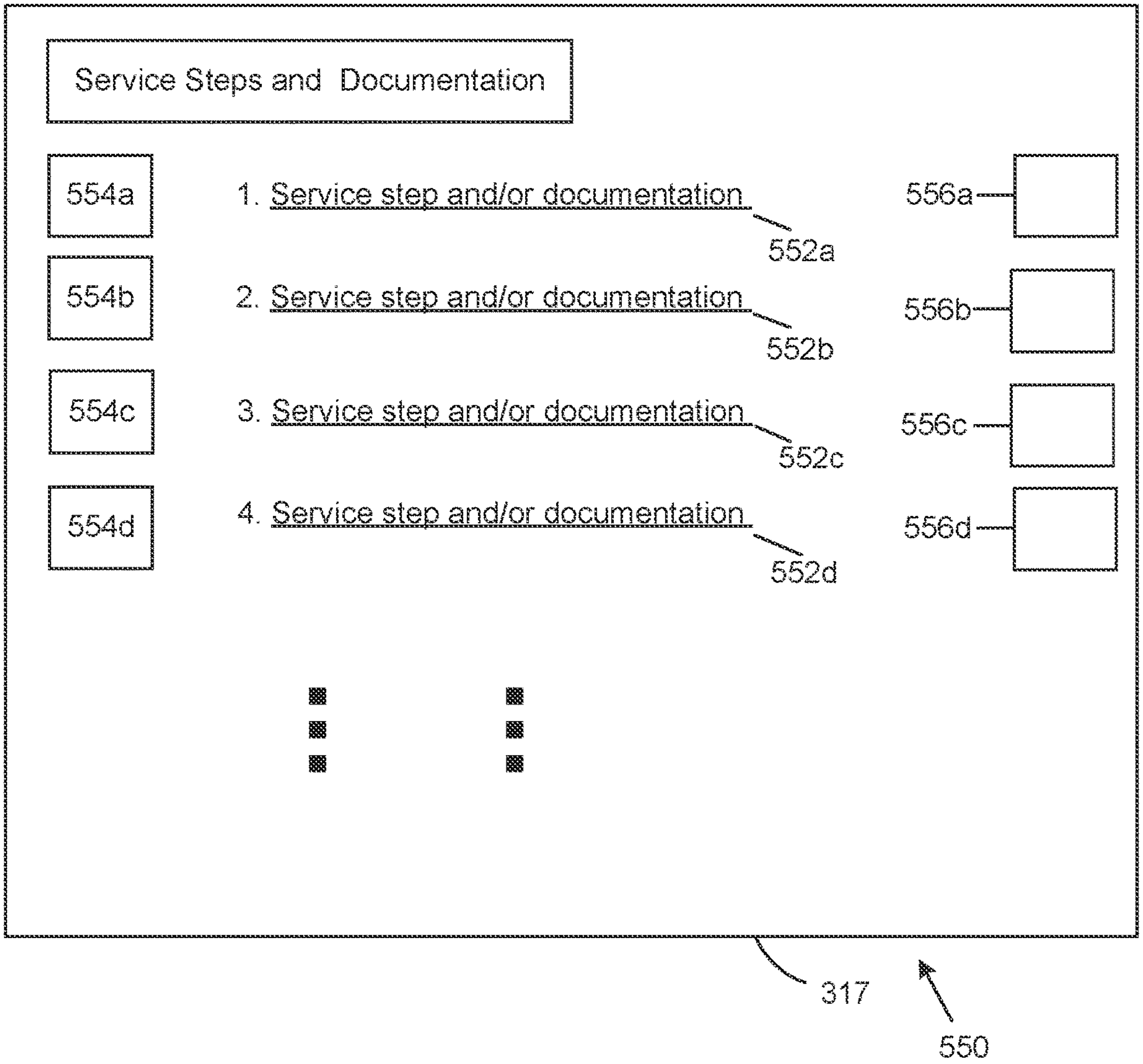
FIG. 5F is a diagram of an exemplary service guide panel displayed on a display screen in accordance with the present invention.

Once the last pre-service checklist item 542 on the checklist panel 540 has been completed and its documentation uploaded, the vehicle 103 is ready for the desired service. As illustrated in FIG. 5F, the service performed by the other service provider 105*b* may be monitored and documented via the scheduling module 122*c* of the diagnostic tool 150*b* as the service is performed. The scheduling module 122*c* of the computing device 111*b*, which is coupled to the diagnostic tool 150*b* may also be used. As illustrated in FIG. 5F, the scheduling module 122*c* displays a service step panel 550 on the display screen 317 that lists the procedural steps and/or the corresponding documentation steps 552*a*-552*d* to be performed. Corresponding completion buttons 554*a*-554*d* and upload confirmation indicators 556*a*-556*d* are arranged on either side. As discussed herein, the service procedural steps displayed on the service step panel 550 are retrieved by the scheduling module 122*c* from the database 117 via the scheduling server 115. Alternatively, the scheduling module 122*c* may access the service procedural steps from a local memory 307 (see FIG. 3). The service procedural steps may include, for example, a calibration step, a verification that the procedural step is complete, and a verification that a calibration documentation is complete, a post-service (e.g., calibration and/or alignment) diagnostic scan, any pre-service steps carried out at the beginning of the service to begin the service, a test drive to confirm the service (or to dynamically calibration one or more vehicle components, e.g., ADAS safety system components) and completion of test drive documents, and other service steps.

As also discussed herein, as each service procedural step 552*a*-552*d* is completed, the corresponding completion button 554*a*-554*d* is actuated. Each actuation may be implemented by manually selecting the clickable button or the actuation may be an automatic output from the diagnostic tool 150*b* during the performance of the service procedural step 552, such as those procedural steps controlled or monitored by the diagnostic tool 150*b*. For example, once a service procedural step 552 has been performed on the vehicle 103, as controlled and/or monitored by the diagnostic tool 105*b*, if the results are acceptable, the corresponding completion button 554 for the service procedural step 552 will be actuated, showing that that particular service procedural step 552 has been carried out. If the service procedural step 552 is performed manually or not monitored by the diagnostic tool 150*b*, the actuation of the corresponding completion button 554 will also be actuated manually.

As each of the service procedural steps 552*a*-552*d* of the requested service are completed, the resulting documentation(s) can be uploaded to the scheduling server 115 via the scheduling module 122*c* of the diagnostic tool 150*b* and/or the computing device 111*b*. Similar to the completion buttons 554*a*-554*d*, as each document is uploaded, the corresponding document upload buttons 556*a*-556*d* are actuated. The upload buttons 556*a*-556*d* are actuated similar to the way that the completion buttons 554*a*-554*d* are actuated. As discussed herein, once the service procedural step documents and the documents generated during the service procedural step(s) have been received by the scheduling server 115, they will be used as part of the post service documentation discussed in detail herein.

Figure 5G:
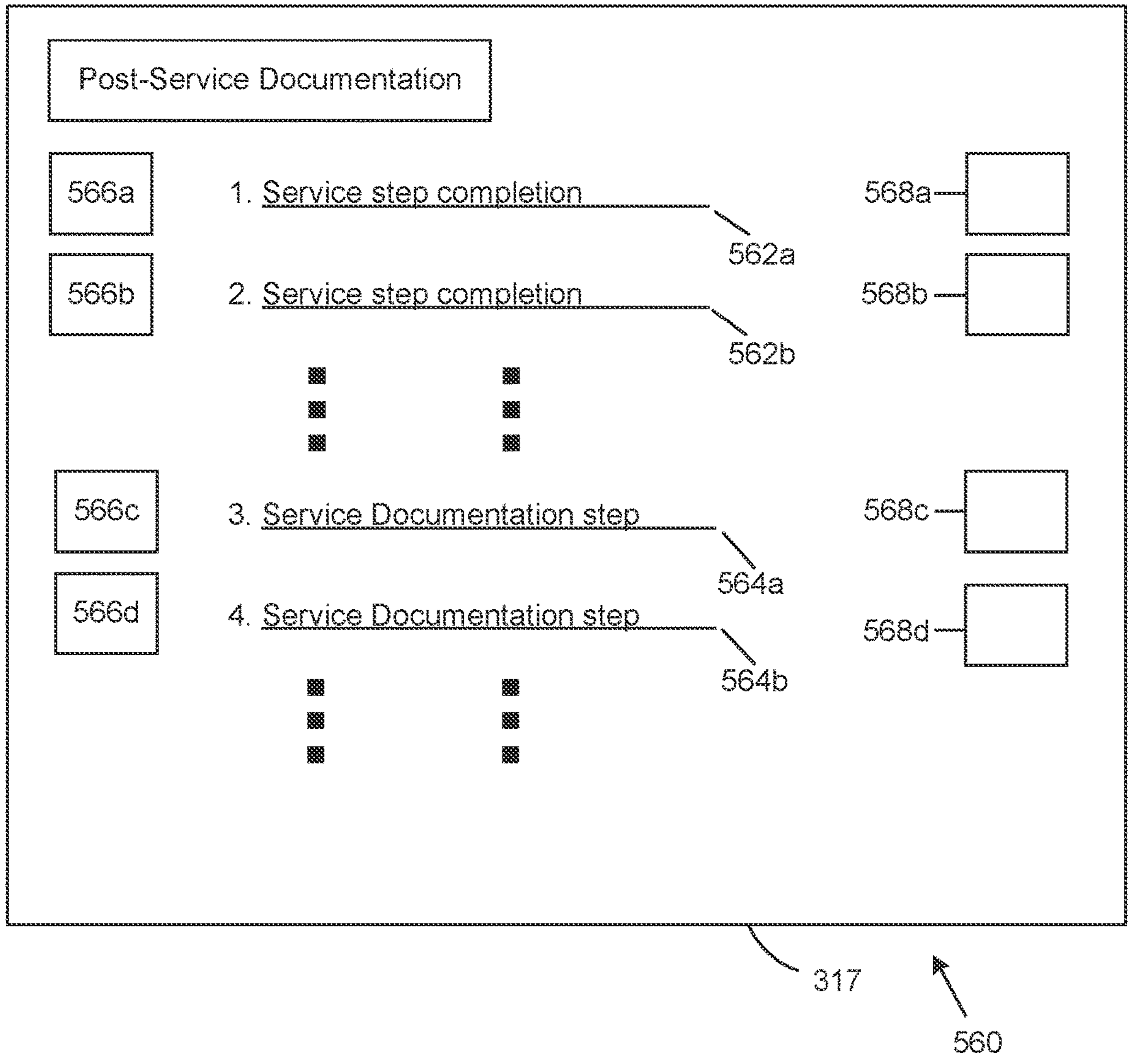
FIG. 5G is a diagram of an exemplary post-service documentation review panel displayed on a display screen in accordance with the present invention.

With the completion of the last procedural step of the requested service, post-service documentation is carried out. As illustrated in FIG. 5G, the scheduling module 122*c* displays a post-service documentation review panel 560 on the display screen 317 of the diagnostic tool 150*b* and/or the computing device 111*b*. The post-service documentation review panel 560 includes a review of the documented procedural steps 562*a*, 562*b* performed during the service as well as a review of the resulting supporting documents 564*a*, 564*b* generated during the service. Completion buttons 566*a*-566*d* and document upload indicators 568*a*-568*d* are arranged on either side of the documented procedural steps 562 and supporting documents 564. As discussed herein, the contents of the post-service documentation review panel 560 are retrieved by the scheduling module 122*c* from the database 117 via the scheduling server 115. Alternatively, the scheduling module 122*c* may access the contents of the post-service documentation review panel 560 from a local memory 307 (see FIG. 3). The documented steps 562 may include, for example, a confirmation that all the procedural steps of a service (e.g., a calibration, alignment, or service performed on ADAS safety system components) have been completed, confirmation that a post-service diagnostic scan was performed and passed, confirmation that pre-service steps were completed and documented, and that a post-service test drive was carried out. The supporting documents 564 may include, for example, imagery (e.g., post-service images of the vehicle, images of test/calibration results, images of printed reports and documents, and final images of the test or procedural equipment), calibration result documents, alignment result documents, diagnostic scan documents, pre-service step documents, and a test drive report.

As also discussed herein, as each post-service procedural step 562 is reviewed and completed, the corresponding completion button 566*a*-566*d* is actuated. Each actuation may be implemented by manually selecting the clickable button or the actuation may be an automatic output from the diagnostic tool 150*b* as the result of the completion of the service procedural step in question, when those procedural steps are controlled or monitored by the diagnostic tool 150*b*. For example, once a service procedural step completion has been confirmed 562*a*, which was controlled and/or monitored by the diagnostic tool 105*b*, if the results were acceptable, the corresponding completion button 566 for the service step will be actuated, showing that that particular service step completion confirmation 562 has been carried out. If the service step completion confirmation 562 is performed manually or not monitored by the diagnostic tool 150*b*, the actuation of the corresponding completion button 566 will also be actuated manually. In a similar fashion, the verification of the supporting documents may be completed and indicated with the completion buttons 566*c*-566*d*. As each of the documented procedural steps 562 and supporting documents 564 for the requested service are completed and/or confirmed, the resulting documentations are uploaded to the scheduling server 115 via the scheduling module 122*c*. Similar to the completion buttons 566*a*-566*d*, as each document is uploaded, the corresponding document upload buttons 568*a*-568*d* are actuated. The document upload buttons 568*a*-568*d* are actuated similar to the way that the completion buttons 566*a*-566*d* are actuated. As discussed herein, once the service procedural step completion confirmation documents and the other documents generated during the service step(s) have been received by the scheduling server 115, they will be used as part of the post-service documentation discussed in detail herein.

After the completion of the service, and the confirmation that all the procedural steps of the service have been properly completed and documented, the scheduling server 115 generates a final service report. Alternatively, the scheduling module 122*c* may be used to generate the final service report. In an aspect of the present embodiment, as part of the final report, once the service has been completed and confirmed, the service requester (e.g., the service provider 105*a*) is informed that the service has been completed. Such a report may also indicate whether there were any issues and whether all steps of the requested service were completed successfully. As a part of preparing this report, the technician that completed the service will also associated with each of the documents that support the final report.

Figure 6:
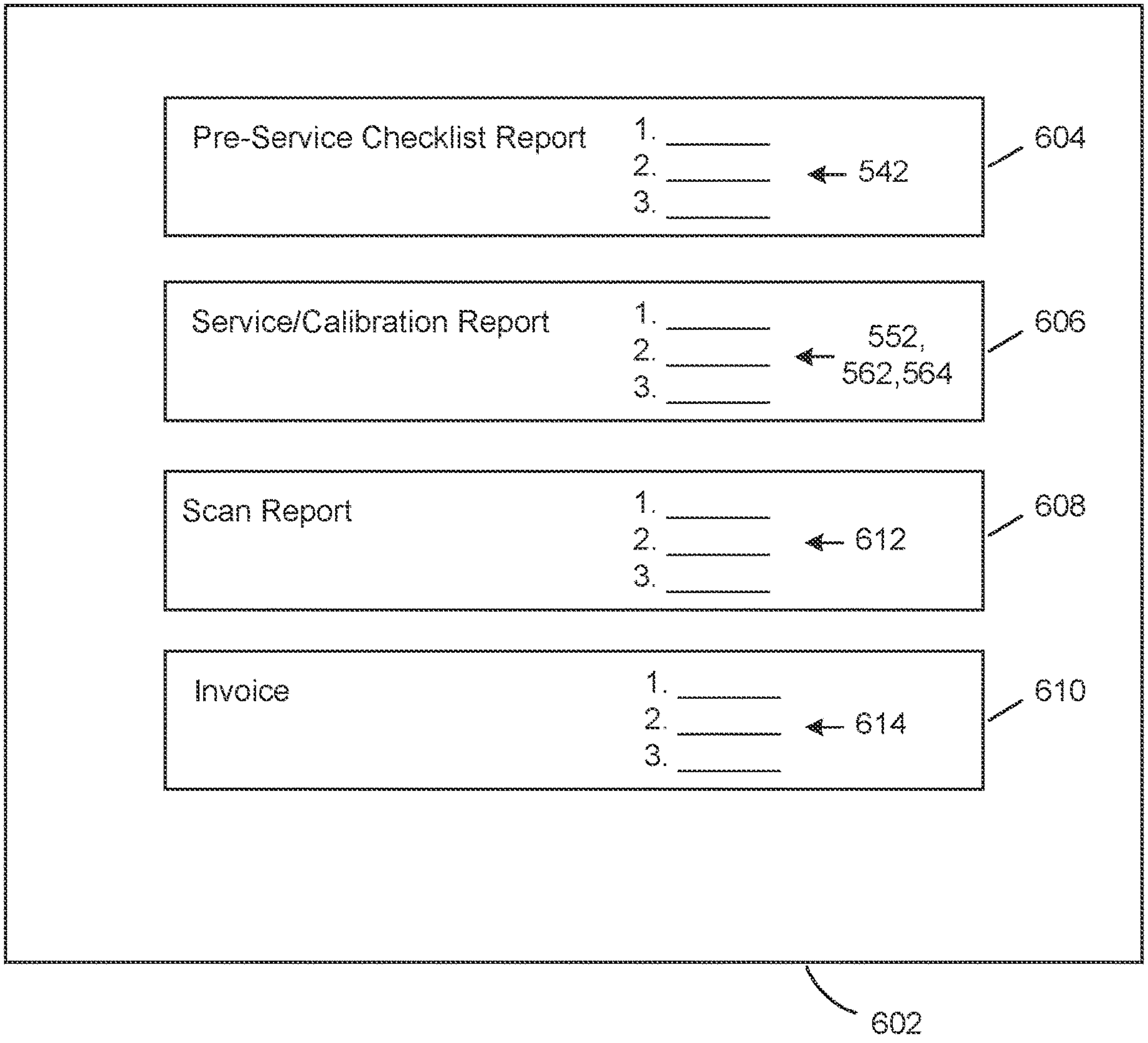
FIG. 6 is a diagram of an exemplary service report panel comprising a plurality of document sources in accordance with the present invention.

As illustrated in FIG. 6, a final report 602 includes, for example, a pre-service checklist report 604, a service and/or calibration report 606, diagnostic scan reports 608, and an invoice 610. The pre-service checklist report 604 includes the reports and documents generated from the pre-service checklist steps 542. The service/calibration report 606 includes the procedural step reports and documents 552, as well as the reviewed documented steps 562 and the supporting documents 564 generated during the service. The diagnostic scan report 608 includes all of the documents 612 generated during any pre-service diagnostic scans, any diagnostic scans run during the service, as well as from any scans run post-service to confirm/validate the service. The invoice 610 includes the individual billing statements 614 for each service performed and/or for each portion of a service performed.

In one embodiment, the final report 602 includes, for example, a service report (e.g., a calibration report) that includes a report of the associated pre-check items that were performed as part of the service, each of the steps to the service and any associated results, and any diagnostic scans performed for the service. The service report also includes an itemized report that includes each step performed for the pre-service checklist, the steps to the requested service, and any steps performed as part of a post-service validation. The final report 602 may be stored in the database 117 and made available to the individual 109 and the service providers 105*a*, 105*b*.

In one embodiment, if the requester (e.g., the individual 109 and/or the service provider 105*a*) does not know what services will be needed, they can use the scheduler module 122*a* (via one of the computing devices 111*a*, 111*c*, the diagnostic tool 150*a*, or the remote computer 180) to request an estimate. As also discussed herein, the scheduler module 122*a* may also be found within the estimating software 132*a* of the diagnostic tool 150*a*, the computing devices 111*a*, 111*c*, or the remote computer 180. For example, the requester, using the selection panel 502 (illustrated in FIG. 5A), the requester can request an estimate for a generalized service (e.g., a calibration) provided by the other service provider 105*b* (and listed in the selection panel 502) without having to select the particular calibration services found within the selection panel 502. Similar to the procedure described above, the requester would select a service location 516 and a timeslot 514 for the service they are seeking an estimate on (via the schedule panel 512 illustrated in FIG. 5B).

Next, the requester would select how the vehicle 103 is to be provided to the service provider 105*b* via the transportation panel 520 illustrated in FIG. 5C. At this point, the request would be sent to the other service provider 105*b*. Similar to the process described herein, once the service provider 105*b* receives the service request (estimate), a technician will be assigned. The service provider 105*b*, using the scheduling module 122*c* on the diagnostic tool 150*b* and/or the computing device 111*b*, will then prepare a list of services that it believes need to be performed. The process can be similar to that described above where the list of requested services and the repair order lines (listing the repair orders that were carried out by the service provider 105*a*) were considered, and then additional services were considered. Here, the generalized service request (e.g., ADAS safety system calibration, wheel alignment, camera and/or radar calibration), the list of repair orders found in the repair order lines, and vehicle information, are used to review the services available at the other service provider 105*b*. As particular services (or service steps) are selected for the estimate, the estimated costs/fees associated with those services or steps are also added. Thus, a list of suggested services and/or service steps are added along with estimates costs for performing these services and/or steps. Thus, the completed estimate will be a suggested list of requested services for the service provider 105*b* to perform. This estimate is then returned to the requester for approval via the network 113 (e.g., the scheduling module 122*c* of the computing device 111*b* communicates the estimate to the scheduling module 122*a* of the computing device 111*a*). The requester is then able to approve or disapprove the estimate or to seek for estimates based on changing service requests.

As noted herein, the service provider 105*b* assigns a technician to perform the requested service. In one embodiment, a technician can be selected based upon their current or future location (e.g., what service location they are working in) and their skill level. For technicians that work on-site, such that the vehicle 103 remains at the requesting service provider 105*a*, the technician can be selected based upon their distance from the location of the vehicle 103. Thus, for multiple service requests and multiple technicians, the service requests (vehicle locations) and available technicians can be matched based upon their distance apart, with technicians being assigned based in part on which one can arrive in the shortest amount of time.

Figure 7:
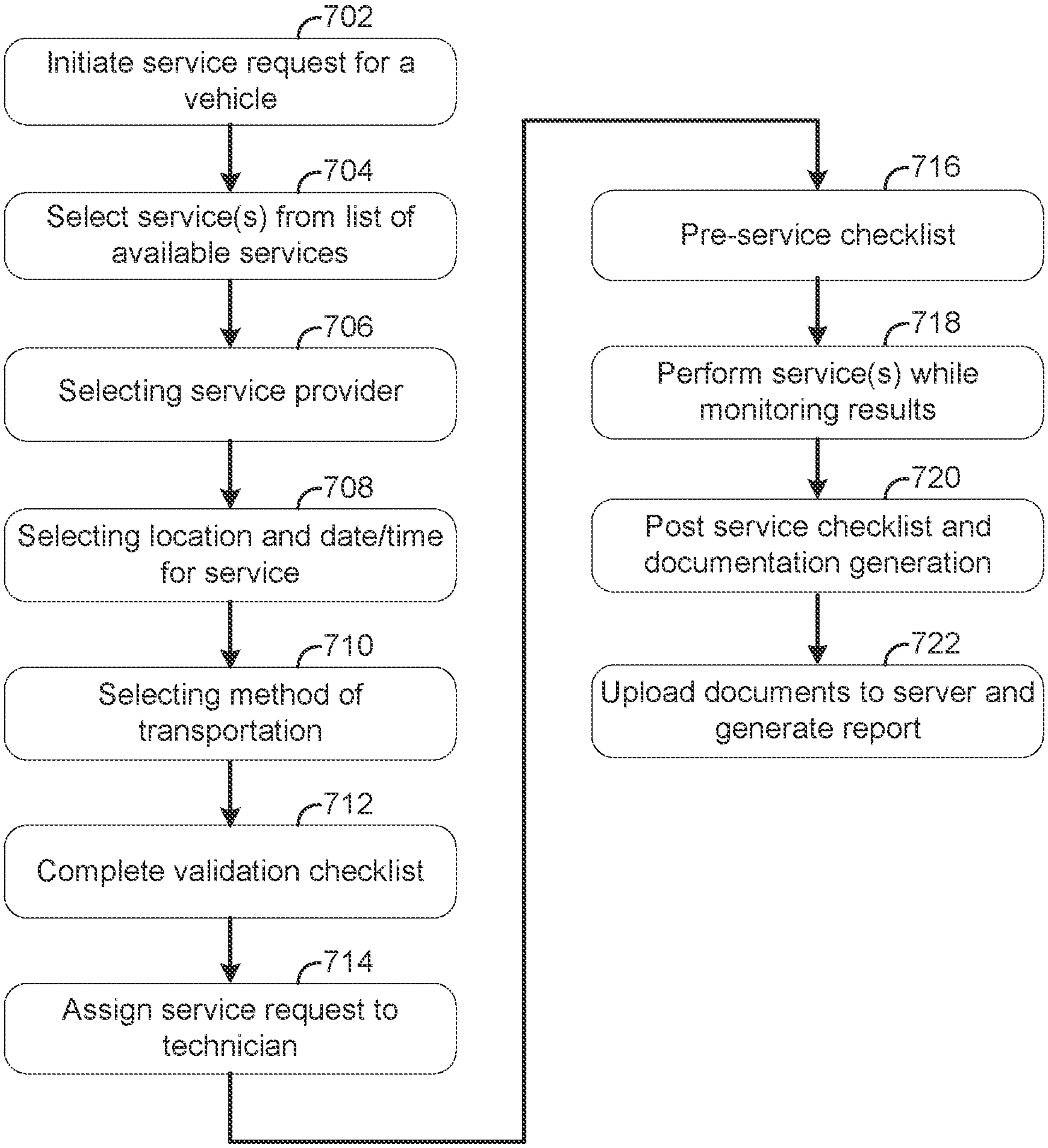
FIG. 7 is a flow diagram illustrating steps to a method for scheduling a service at a service provider in accordance with the present invention.

FIG. 7 depicts the steps performed in a method 700 for scheduling a service on a vehicle. As discussed herein, the steps to the method are performed using scheduling modules 122*a* that output selectable information for display on display screens 317 of electronic devices. As discussed herein, the scheduling module 122*a* may be access from within estimating software 132 on the electronic devices. In step 702 of FIG. 7, using the scheduling module 122*a*, a service request is initiated for a vehicle 103. As discussed herein, the requester can be an individual 109, such as, the owner of the vehicle, an insurance representative, or the service provider 105*a* that performed a service on the vehicle 103 (e.g., body work or repair), and needs to request a service from another service provider 105*b*. When the service request is initiated, the service request includes the vehicle make, model, year, VIN, and insurer, as well as list of the work lines from the repair order for the vehicle 103. In step 704 of FIG. 7, individual services are selected from a list of available services displayed on a display screen of the electronic device running the scheduling module 122*a*. The list of available services may be limited by the available services offered by a selected service provider, as well as limited by the systems on the vehicle, and those that were involved in the work lines of the repair order and likely needing additional service. With this review, the most likely service requests are displayed to the requester. In step 706 of FIG. 7, based upon the list of selected services, a service provider is selected from a list of service providers able to perform the requested services. The selection of service provider may also be performed via the scheduler module 122*a*. In one embodiment, when the service request is begun, a service provider may be initially selected and then the services selected (based upon the services offered by the selected service provider).

In step 708 of FIG. 7, a desired service location and date/time are selected from a schedule panel displayed by the scheduling module 122*a*. The schedule panel will list the available service locations and their available timeslots for performing the requested service(s). In step 710 of FIG. 7, the requester selects how the vehicle 103 is to be provided to the service provider 105*b*. For example, the vehicle 103 can be delivered to the service provider 105*b*, driven to the service provider 105*b*, towed to the service provider 105*b* (one way or round trip), or other methods may be selected.

In step 712 of FIG. 7, once the service provider and the desired services are selected, a vehicle validation is performed before making the vehicle available to the requested service provider. In one embodiment, the vehicle validation may include, for example, a series of service preparation steps (that are displayed on the display screen 317) that may include a variety of vehicle safety and procedural steps. For example, the steps may include a verification that a post repair scan has been completed, that the fuel tank has been filled (or is full), that tire pressure levels have been checked and validated, and that any vehicle alignments performed by the service provider 105*a* have been verified. The vehicle validation may be performed at other times before providing the vehicle to the other service provider 105*b* via the scheduling module 122*c*.

In step 714 of FIG. 8, a technician is assigned to perform the requested service. The technician can be assigned based upon his proximity to the requested service location. For example, if the service location is on-site at the current location of the vehicle 103 (at service provider 105*a*), the technician may be assigned based upon their proximity to the vehicle 103 such that the closest technician (with the necessary skills) is assigned to perform the requested service.

In step 716 of FIG. 7, after the vehicle 103 has been delivered to the service location, or the technician arrives at the vehicle location, a pre-service checklist of items that need to be completed before the later service are performed using the scheduling module 122*c*. These pre-service items include documentary images of the vehicle (e.g., interior, exterior, photo of VIN, and photo of vehicle dash), any equipment setup, tire pressure level validation, any required vehicle alignment checks, and identification and setup of calibration targets. As discussed herein, the pre-service checklist provides a list of items that when completed aid in documenting the process the service provider 105*b* used in preparing for the requested service.

In step 718 of FIG. 7, the requested service is performed. As described herein, using the scheduling module 122*c*, the diagnostic tool 150*b* may be used to monitor and/or control the performance of the steps to the service(s) performed on the vehicle 103. The scheduling module 122*c* is also used to monitor and document the progress of the completion of the steps to the service that is being provided. For example, the service step panel 550 of the scheduling module 122*c* (and displayed on the display screen 317) may be used to check off each procedural step of the requested service process as it is performed. As each procedural step is completed, the scheduling module 122*c* may be used to monitor and confirm that reports and other documentary evidence of the procedural step has been completed and properly uploaded for storage.

In step 720 of FIG. 7, a post-service checklist and documentation process is performed. As discussed herein, the post-service documentation review panel 560 of the scheduling module 122*c* is used to monitor and review the service steps, their resulting documents, and any other supporting documents that are also generated. The documented procedural steps may include, for example, a confirmation that the procedural steps of a service (e.g., a calibration, alignment, or service performed on ADAS safety system components) have been completed, confirmation that a post-service diagnostic scan was performed and passed, confirmation that pre-service steps were completed and documented, and that a post-service test drive was carried out. The supporting documents may include, for example, imagery (e.g., post-service images of the vehicle, images of test/calibration results, images of printed documents related to the procedural steps, and final images of the test or procedural equipment), calibration result documents, alignment result documents, diagnostic scan documents, pre-service step documents, and a test drive report.

Finally, in step 722 of FIG. 7, the documents, reports, imagery, and anything else generated before, during, and after the service, is uploaded to the scheduling server 115 to generate a final report. In one embodiment, the final report includes a pre-service checklist report, a service and/or calibration report, diagnostic scan reports, and an invoice. The pre-service checklist report includes the reports and documents generated from the pre-service checklist steps. The service/calibration report includes the documented procedural steps and supporting documents generated during the service. The diagnostic scan reports include all of the documents generated during any pre-service diagnostic scans, any diagnostic scans run during the service, as well as from any scans run post-service to confirm/validate the service. The invoice includes the individual billing statements for each service performed and/or for each portion of a service performed. In one embodiment, the final report includes, for example, a service report (e.g., a calibration report) that includes a report of the associated pre-check items that were performed as part of the service, each of the steps to the service and any associated results, and any diagnostic scans performed for the service. The service report also includes an itemized report that includes each step performed for the pre-service checklist, the steps to the requested service, and any steps performed as part of a post-service validation. The final report may be stored in the database 117 and made available to the individual 109 and the service providers 105*a*, 105*b*.

While the diagnostic tool 150 (and the optional portable computing device 170), as discussed herein, conforms with the SAE J2534 standard, it should be appreciated that alternatively configured vehicle diagnostic tools may be employed (for monitoring the performance and procedural steps of a test drive) within the scope of the present embodiments, including alternatively configured tools for alternative types of vehicles, such as alternative classes of vehicles. Accordingly, an interface tool of the diagnostic tool 150 may conform with the ISO 22900 standard, or RP1210 standard, or may operate under the ELM327 command protocol.

It should be appreciated that the scheduling software program or module may comprise one or more program files that are operable to interact together to perform the above noted features.

As noted, the software and/or hardware of diagnostic tools may be required to be updated to operate with new vehicles and/or enable programming and diagnosing of existing vehicles. In the above noted embodiments, the diagnostic tool 150 (and the optional portable computing device 170) may be periodically updated via an Internet connection, or may be returned to the supplier for updating, including with regard to hardware updates. This may be done by the supplier of the diagnostic tool 150 (and the optional portable computing device 170) whereby the local operator need not spend time attempting to maintain the equipment. As illustrated in FIG. 2, one or more optional cameras 202, 204 may be mounted within the vehicle to document the service performed (e.g., a test drive). As discussed herein, data 107, such as images, video, GPS position information, performance metrics, or other like information may be captured by the vehicle diagnostic computer tool 150*a* from the vehicle 103. The vehicle diagnostic computer tool 150*a* and optional cameras 202, 204 may be employed in a vehicle test drive system and method as disclosed in U.S. Pat. No. 11,373,465, which is incorporated herein by reference in its entirety, where for example, the system of the present invention provides improved functionality, operation, and data collection.

In a further illustrated embodiment, the diagnostic tool 150 is implemented as a laptop computer with integrated monitor, keyboard, and mouse.

Thus, the vehicle service scheduling system 100 and methods may be used for managing and scheduling vehicle services. The vehicle service scheduling system includes a scheduling program module. The scheduling module may be local to a portable computer or a diagnostic tool. Alternatively, the scheduling module may be remotely instanced by the portable computer or the diagnostic tool via a scheduler server, which includes the scheduling module. The scheduling module may also be accessed from an estimating software of the portable computer or the diagnostic tool. The scheduling program module may be used to initiate service requests for vehicles by communicating with the scheduler server via a network connection to schedule requested services from selected service providers who provide the requested service. After a particular service provider for the vehicle service is selected, a particular day/time is also selected from a list of available timeslots. When a timeslot is selected, the service provider receives the service request. After completing any vehicle validations, the selected service provider assigns a technician and/or service location to perform the selected service. Finally, a notice that a technician or service location has been assigned by the service provider is sent to the requester. As described herein, when the selected service provider receives the vehicle, the scheduling module may be used to manage and monitor a pre-service checklist that includes items needed to confirm that the vehicle, the test, calibration, and/or procedure is set up and prepared for the service, and to document the condition of the vehicle and the preparation steps performed before beginning the service. The scheduling module is also used to monitor and document the procedural steps of the service as it is performed and to ensure that the resulting reports and documentation are uploaded and stored for later use. Lastly, a post-service review is performed with the scheduling module, the procedural steps to the service are reviewed and all resulting documentation and supporting documentation is retrieved, uploaded, and stored for later use. The uploaded documents are used to generate a report for the service.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. A method of scheduling an outsourced vehicle service provided by a service provider, said method comprising:

providing access to a service scheduling program at a repair facility via a vehicle diagnostic computer tool or via a vehicle repair estimating software system, wherein the vehicle diagnostic computer tool is configured to be operatively connected to a diagnostic port of a vehicle to be in communication with an electronic system of the vehicle to scan the electronic system and wherein the vehicle repair estimating software system comprises a computer integrated with a vehicle repair estimating software program, and wherein the service scheduling program is integrated into or accessible by the vehicle diagnostic computer tool or the vehicle repair estimating software system;

performing a diagnostic scan of the electronic system of the vehicle with the vehicle diagnostic computer tool to obtain diagnostic scan results of the vehicle after the vehicle diagnostic computer tool has been operatively connected to the diagnostic port of the vehicle;

evaluating, with the service scheduling program, the diagnostic scan results from the vehicle diagnostic computer tool to determine whether the diagnostic scan results include any diagnostic trouble codes;

either scheduling, with the service scheduling program, an outsourced service for the vehicle to be performed by an outsourced service provider at a service location if the service scheduling program determines that the diagnostic scan results do not include any diagnostic trouble codes, wherein said scheduling with the service scheduling program is performed with the vehicle diagnostic computer tool or the vehicle repair estimating software system via their respective interactive display screens, or preventing scheduling the outsourced service by the service scheduling program if the service scheduling program determines that the diagnostic scan results include diagnostic trouble codes, wherein said scheduling of the outsourced service is done by a repair service provider of the repair facility using the service scheduling program and comprises:

displaying an identification, with the service scheduling program, of one or more potential outsourced service providers for performing the outsourced service via the respective interactive display screens of the vehicle diagnostic computer tool or of the vehicle repair estimating software system;

displaying, with the service scheduling program, one or more potential appointment times via the respective interactive display screens of the vehicle diagnostic computer tool or of the vehicle repair estimating software system for the one or more potential outsourced service providers for performing the outsourced service, wherein the potential appointment times are retrieved by the service scheduling program from a database, wherein the appointment time comprises a date or a date and a time;

selecting, with the service scheduling program, via the interactive display screen of the vehicle diagnostic computer tool or of the vehicle repair estimating software system, an outsourced service provider from the one or more potential outsourced service providers; and selecting, with the service scheduling program, via the interactive display screen of the vehicle diagnostic computer tool or of the vehicle repair estimating software system, an appointment time for the outsourced service.

2. The method of claim 1, wherein the service scheduling program is configured to filter potential outsourced service providers based on at least one scheduling factor, wherein said providing, with the service scheduling program, one or more potential outsourced service providers for performing the outsourced service comprises providing, with the service scheduling program, one or more potential outsourced service providers for performing the outsourced service based on the at least one scheduling factor.

3. The method of claim 2, wherein the at least one scheduling factor comprises a qualification to perform the required outsourced service, and wherein only outsourced service providers that are qualified to perform the required outsourced service are provided via the service scheduling program.

4. The method of claim 2, wherein the at least one scheduling factor comprises an availability of the outsourced service provider, and wherein said scheduling the outsourced service further comprises receiving, by the service scheduling program, from the repair service provider a desired appointment time for the outsourced service, and wherein only outsourced service providers that are available at the desired appointment time are provided via the service scheduling program, and wherein the desired appointment time may comprise a date, a date range, a time, and/or a time range.

5. The method of claim 2, wherein the at least one scheduling factor comprises a distance from the repair facility to the outsourced service provider, and wherein said scheduling the outsourced service further comprises receiving, by the service scheduling program, from the repair service provider a distance limit for the distance between the repair facility and the outsourced service provider, and wherein only outsourced service providers that are within the distance limit are provided via the service scheduling program.

6. The method of claim 1, wherein said scheduling the outsourced service further comprises providing, with the service scheduling program, a distance from the repair facility to each of the one or more potential outsourced service providers.

7. The method of claim 1, wherein the outsourced service is a vehicle calibration or a vehicle safety system service for the vehicle.

8. The method of claim 1, further comprising providing, with the service scheduling program, at least one qualification questions to be answered by the repair service provider, and wherein said scheduling the outsourced service may be prevented or permitted based on responses to the qualification questions, wherein the vehicle requires a plurality of vehicle services, and wherein the at least one qualification questions comprise a query as to which of the plurality of vehicle services have already been completed.

9. The method of claim 8, wherein the at least one qualification question comprises whether the vehicle is equipped with a particular component and whether that particular component is ready for an associated outsourced vehicle service.

10. The method of claim 1, wherein the service location comprises the repair facility or a facility to which the vehicle is provided from the repair facility, and wherein said scheduling the outsourced service further comprises selecting, with the service scheduling program, the service location.

11. The method of claim 1, wherein the service scheduling program comprises a scheduling program module retained on the vehicle diagnostic computer tool or on the vehicle repair estimating software system.

12. The method of claim 11, wherein the scheduling program module communicates with a scheduling server via a network connection during said scheduling the outsourced service.

13. The method of claim 1, further comprising generating an estimate of vehicle repairs using the vehicle repair estimating software system, and wherein said scheduling the outsourced service comprises scheduling the outsourced service during said generating an estimate of vehicle repairs using the vehicle repair estimating software system.

14. The method of claim 1, wherein said scheduling the outsourced service further comprises transmitting a service schedule notification to a remote computing device of the outsourced service provider.

15. The method of claim 14, wherein said scheduling the outsourced service further comprises transmitting a service schedule confirmation to the repair service provider.

* * * * *